(12) United States Patent
Kim et al.

(10) Patent No.: US 12,090,354 B2
(45) Date of Patent: *Sep. 17, 2024

(54) ENERGY STORAGE MODULE

(71) Applicant: SAMSUNG SDI CO., LTD., Yongin-si (KR)

(72) Inventors: Jin Taek Kim, Yongin-si (KR); Eun Ok Kwak, Yongin-si (KR); Jin Bhum Yun, Yongin-si (KR); Jang Hoon Kim, Yongin-si (KR); Jong Yeol Woo, Yongin-si (KR); Kwang Deuk Lee, Yongin-si (KR); Woo Sung Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/014,970

(22) Filed: Sep. 8, 2020

(65) Prior Publication Data

US 2021/0069536 A1 Mar. 11, 2021

(30) Foreign Application Priority Data

Sep. 5, 2019 (KR) .......................... 10-2019-0110367
Sep. 4, 2020 (KR) .......................... 10-2020-0113376

(51) Int. Cl.
*H01M 10/658* (2014.01)
*A62C 3/16* (2006.01)
(Continued)

(52) U.S. Cl.
CPC ............ *A62C 3/16* (2013.01); *A62C 99/0045* (2013.01); *H01M 50/20* (2021.01);
(Continued)

(58) Field of Classification Search
CPC ....... H01M 50/35–367; H01M 50/342; H01M 50/3425; H01M 50/383; H01M 50/394; H01M 50/471–486
See application file for complete search history.

(56) References Cited

U.S. PATENT DOCUMENTS 5,047,272 A 9/1991 Hassel et al.
5,817,434 A 10/1998 Brooker et al.
(Continued)

FOREIGN PATENT DOCUMENTS

CN 101847709 A 9/2010
CN 102468463 A 5/2012
(Continued)

OTHER PUBLICATIONS

CN 109585726 A. Apr. 5, 2019. English machine translation. (Year: 2019).
(Continued)

*Primary Examiner* — James Lee
(74) *Attorney, Agent, or Firm* — Lewis Roca Rothgerber Christie LLP

(57) ABSTRACT

An energy storage module includes: a plurality of battery cells arranged in a length direction, each of the battery cells including a vent; a plurality of insulation spacers, at least one of the insulation spacers being located between long side surfaces of an adjacent pair of the battery cells; a cover member; a top plate coupled to a top portion of the cover member and including ducts respectively corresponding to the vents of the battery cells and including opening holes respectively corresponding to the insulation spacers; a top cover coupled to a top portion of the top plate and including discharge holes located in an exhaust area and respectively corresponding to the ducts; and an extinguisher sheet located between the top cover and the top plate, configured to emit a fire extinguishing agent at a temperature exceeding a
(Continued)

certain temperature and including opening holes located to correspond to the ducts.

21 Claims, 28 Drawing Sheets

(51) Int. Cl.
*A62C 99/00* (2010.01)
*H01M 50/20* (2021.01)
*H01M 50/30* (2021.01)
*H01M 50/383* (2021.01)
*H01M 50/40* (2021.01)
*H01M 50/431* (2021.01)
*H01M 50/44* (2021.01)

(52) U.S. Cl.
CPC ....... *H01M 50/394* (2021.01); *H01M 50/431* (2021.01); *H01M 50/44* (2021.01); *H01M 2200/10* (2013.01); *H01M 2220/10* (2013.01)

(56) References Cited

U.S. PATENT DOCUMENTS

| | | | |
|---|---|---|---|
| 6,136,423 A | 10/2000 | Fitzpatrick | |
| 6,365,299 B1 | 4/2002 | Miyaki et al. | |
| 7,385,480 B2 | 6/2008 | Fitzpatrick | |
| 8,557,437 B2 | 10/2013 | Hinoki et al. | |
| 8,597,808 B2 | 12/2013 | Park et al. | |
| 8,652,666 B2 | 2/2014 | Kim | |
| 8,722,253 B2 | 5/2014 | Hinoki et al. | |
| 9,406,917 B2 | 8/2016 | Petzinger | |
| 9,627,663 B2 | 4/2017 | Kim | |
| 10,164,229 B2 | 12/2018 | Ohshiba et al. | |
| 10,355,326 B2 | 7/2019 | Petzinger | |
| 10,930,910 B2 | 2/2021 | Fujiwara et al. | |
| 11,038,226 B2 | 6/2021 | Lee et al. | |
| 11,145,933 B2* | 10/2021 | Kim .................. | H01M 50/383 |
| 11,185,726 B2 | 11/2021 | Lee | |
| 2002/0179552 A1 | 12/2002 | Marraffa | |
| 2003/0134203 A1 | 7/2003 | Fan et al. | |
| 2007/0164711 A1 | 7/2007 | Kim et al. | |
| 2010/0167115 A1 | 7/2010 | Okada et al. | |
| 2010/0248026 A1 | 9/2010 | Hinoki et al. | |
| 2011/0005781 A1 | 1/2011 | Yasui et al. | |
| 2011/0165454 A1 | 7/2011 | Iwamoto et al. | |
| 2011/0274951 A1 | 11/2011 | Yasui et al. | |
| 2011/0313084 A1 | 12/2011 | Furar et al. | |
| 2012/0114993 A1 | 5/2012 | Park et al. | |
| 2012/0270083 A1 | 10/2012 | Kim | |
| 2013/0011701 A1 | 1/2013 | Petzinger | |
| 2013/0052452 A1 | 2/2013 | Lee et al. | |
| 2013/0264077 A1 | 10/2013 | Jung | |
| 2013/0313466 A1 | 11/2013 | Bliznets et al. | |
| 2013/0344384 A1 | 12/2013 | Hinoki et al. | |
| 2014/0170447 A1 | 6/2014 | Woehrle et al. | |
| 2014/0322566 A1 | 10/2014 | Kim | |
| 2015/0064514 A1 | 3/2015 | Wu et al. | |
| 2015/0079426 A1 | 3/2015 | Chen et al. | |
| 2015/0099191 A1 | 4/2015 | Liu et al. | |
| 2015/0221914 A1 | 8/2015 | Page et al. | |
| 2015/0280193 A1 | 10/2015 | Ohshiba et al. | |
| 2015/0303421 A1 | 10/2015 | Tazawa et al. | |
| 2016/0049626 A1 | 2/2016 | Yasui et al. | |
| 2016/0104880 A1 | 4/2016 | Gao et al. | |
| 2016/0218333 A1 | 7/2016 | Takasaki et al. | |
| 2016/0254515 A1 | 9/2016 | Shimoda et al. | |
| 2016/0268564 A1 | 9/2016 | Cho et al. | |
| 2016/0315361 A1 | 10/2016 | Petzinger | |
| 2017/0165513 A1 | 6/2017 | Li | |
| 2017/0334310 A1 | 11/2017 | Yokoyama et al. | |
| 2018/0026245 A1 | 1/2018 | Page et al. | |
| 2018/0190956 A1 | 7/2018 | Lica et al. | |
| 2018/0248160 A1 | 8/2018 | Lee | |
| 2018/0269440 A1 | 9/2018 | Lee et al. | |
| 2018/0294516 A1 | 10/2018 | Huang et al. | |
| 2018/0309107 A1 | 10/2018 | Widener | |
| 2019/0020079 A1 | 1/2019 | Lee et al. | |
| 2019/0109331 A1 | 4/2019 | Skala | |
| 2019/0168037 A1 | 6/2019 | Lian et al. | |
| 2019/0168615 A1 | 6/2019 | Besson et al. | |
| 2019/0173074 A1 | 6/2019 | Ogawa et al. | |
| 2019/0181419 A1 | 6/2019 | Suba et al. | |
| 2019/0305391 A1 | 10/2019 | Petzinger | |
| 2019/0334143 A1 | 10/2019 | Sugeno | |
| 2020/0014027 A1 | 1/2020 | Ha et al. | |
| 2020/0014078 A1 | 1/2020 | Ha et al. | |
| 2020/0168884 A1 | 5/2020 | Wang et al. | |
| 2020/0243823 A1 | 7/2020 | Morita | |
| 2020/0287180 A1 | 9/2020 | Chen et al. | |
| 2020/0303701 A1 | 9/2020 | Kim et al. | |
| 2020/0350557 A1 | 11/2020 | Ha et al. | |
| 2020/0350566 A1 | 11/2020 | Ha et al. | |
| 2020/0350567 A1 | 11/2020 | Ha et al. | |
| 2020/0350568 A1 | 11/2020 | Lee et al. | |
| 2020/0350574 A1 | 11/2020 | Ha et al. | |
| 2020/0350580 A1 | 11/2020 | Ha et al. | |
| 2020/0350632 A1 | 11/2020 | Ha et al. | |
| 2020/0377690 A1 | 12/2020 | Ootsuki et al. | |
| 2021/0013460 A1 | 1/2021 | Ootsuki et al. | |
| 2021/0296625 A1 | 9/2021 | Li et al. | |
| 2021/0320337 A1 | 10/2021 | Chen et al. | |
| 2021/0328281 A1 | 10/2021 | Chu et al. | |
| 2021/0328304 A1 | 10/2021 | You et al. | |
| 2022/0059902 A1 | 2/2022 | Jiang et al. | |
| 2022/0069411 A1 | 3/2022 | Wakabayashi et al. | |
| 2022/0140434 A1 | 5/2022 | Yoshida et al. | |
| 2022/0149477 A1 | 5/2022 | Yoshida et al. | |
| 2022/0149478 A1 | 5/2022 | Egashira et al. | |

FOREIGN PATENT DOCUMENTS

| | | |
|---|---|---|
| CN | 106654462 A | 5/2017 |
| CN | 106785225 A | 5/2017 |
| CN | 206564279 U | 10/2017 |
| CN | 206584999 U | 10/2017 |
| CN | 206834290 U | 1/2018 |
| CN | 107887550 A | 4/2018 |
| CN | 207199806 U | 4/2018 |
| CN | 207474524 U | 6/2018 |
| CN | 207977389 U | 10/2018 |
| CN | 109273803 A | 1/2019 |
| CN | 109585726 A | 4/2019 |
| EP | 3 386 003 A1 | 10/2018 |
| EP | 3 591 737 A1 | 1/2020 |
| EP | 3 866 233 A1 | 8/2021 |
| JP | 2014135234 A | 7/2014 |
| JP | 2016-110881 A | 6/2016 |
| JP | 6245038 B2 | 12/2017 |
| JP | 6390062 B2 | 9/2018 |
| JP | 2019-213332 A | 12/2019 |
| KR | 10-1067627 B1 | 9/2011 |
| KR | 2012-0049020 A | 5/2012 |
| KR | 2012-0119407 A | 10/2012 |
| KR | 2014-0127743 A | 11/2014 |
| KR | 10-2016-0021325 A | 2/2016 |
| KR | 10-2016-0146349 A | 12/2016 |
| KR | 10-2019-0023917 A | 3/2019 |
| WO | WO 2013/006796 A1 | 1/2013 |
| WO | WO 2019/117485 A1 | 6/2019 |
| WO | WO 2020/203646 A1 | 10/2020 |

OTHER PUBLICATIONS

U.S. Office Action dated Oct. 20, 2021, issued in U.S. Appl. No. 16/901,474 (21 pages).
EPO Extended European Search Report dated Feb. 8, 2021, issued in corresponding European Patent Application No. 20194592.0 (9 pages).
European Patent Office Extended Search Report, for Patent Application No. 20194573.0, dated Feb. 12, 2021, 9 pages.
European Patent Office Extended Search Report, for Patent Application No. 20194589.6, dated Mar. 5, 2021, 9 pages.

(56) References Cited

OTHER PUBLICATIONS

European Patent Office Extended Search Report, for Patent Application No. 20194607.6, dated Feb. 8, 2021, 10 pages.
European Patent Office Extended Search Report, for Patent Application No. 20194594.6, dated Feb. 10, 2021, 9 pages.
European Patent Office Extended Search Report, for Patent Application No. 20194611.8, dated Feb. 16, 2021, 9 pages.
European Patent Office Extended Search Report, for Patent Application No. 20194587.0, dated Feb. 16, 2021, 10 pages.
Machine English Translation of CN207199806U, 3 pages.
PubChem Compound Summary for Vermiculite, retrieved on Apr. 5, 2022 from the Internet: https://pubchem.ncbi.nlm.nih.gov/compound/156593754 (Year: 2022).
"The Engineering Tool Box", https://www.engineeringtoolbox.com/density-materials-d1652.html, Aug. 30, 2021 (Year: 2021), 16 pages.
U.S. Advisory Action from U.S. Appl. No. 16/844,914, dated Jan. 20, 2022, 4 pages.
U.S. Notice of Allowance from U.S. Appl. No. 16/901,538, dated Mar. 18, 2022, 8 pages.
U.S. Notice of Allowance from U.S. Appl. No. 16/901,547, dated Jul. 23, 2021, 8 pages.
U.S. Office Action from U.S. Appl. No. 16/844,914, dated Aug. 19, 2021, 18 pages.
U.S. Office Action from U.S. Appl. No. 16/844,914, dated Mar. 17, 2022, 24 pages.
U.S. Office Action from U.S. Appl. No. 16/844,914, dated Nov. 9, 2021, 18 pages.
U.S. Office Action from U.S. Appl. No. 16/901,522, dated Dec. 13, 2021, 40 pages.
U.S. Office Action from U.S. Appl. No. 16/901,527, dated Apr. 11, 2022, 24 pages.
U.S. Office Action from U.S. Appl. No. 16/901,538, dated Nov. 23, 2021, 20 pages.
U.S. Office Action from U.S. Appl. No. 16/901,541, dated Dec. 8, 2021, 32 pages.
U.S. Office Action from U.S. Appl. No. 16/901,541, dated Mar. 22, 2022, 17 pages.
U.S. Office Action from U.S. Appl. No. 17/014,034, dated Dec. 13, 2021, 40 pages.
U.S. Office Action from U.S. Appl. No. 17/014,061, dated Feb. 15, 2022, 20 pages.
U.S. Office Action from U.S. Appl. No. 17/014,853, dated Dec. 13, 2021, 39 pages.
U.S. Office Action from U.S. Appl. No. 17/014,900, dated Dec. 10, 2021, 21 pages.
U.S. Office Action from U.S. Appl. No. 17/014,900, dated Mar. 28, 2022, 8 pages.
U.S. Office Action from U.S. Appl. No. 17/014,976, dated Dec. 22, 2021, 24 pages.
U.S. Restriction Requirement from U.S. Appl. No. 16/844,914, dated May 12, 2021, 6 pages.
Collins Online Dictionary entry for "space", accessed at https://www.collinsdictionary.com/us/dictionary/english/space on May 18, 2022 (Year: 2022).
Google define feature utilizing Oxford Languages Dictionary for "space", accessed at google.com on May 18, 2022 (Year: 2022).
U.S. Office Action from U.S. Appl. No. 16/901,522, dated May 27, 2022, 24 pages.
U.S. Notice of Allowance from U.S. Appl. No. 16/901,541, dated Jun. 1, 2022, 8 pages.
U.S. Office Action from U.S. Appl. No. 17/014,034, dated May 25, 2022, 38 pages.
U.S. Office Action from U.S. Appl. No. 17/014,853, dated May 31, 2022, 24 pages.
U.S. Office Action from U.S. Appl. No. 16/901,474, dated Apr. 25, 2022, 37 pages.
Advisory Action for U.S. Appl. No. 16/901,474 dated Jul. 7, 2022, 4 pages.
Final Office Action for U.S. Appl. No. 17/014,976 dated Jun. 7, 2022, 24 pages.
Advisory Action for U.S. Appl. No. 17/014,061 dated Oct. 21, 2022, 7 pages.
Chinese Office Action for CN Application No. 202010921939.7 dated Aug. 1, 2022, 9 pages.
Notice of Allowance for U.S. Appl. No. 17/014,976 dated Oct. 19, 2022, 8 pages.
U.S. Office Action dated Feb. 24, 2023, issued in U.S. Appl. No. 16/901,527 (26 pages).
U.S. Notice of Allowance dated Mar. 7, 2023, issued in U.S. Appl. No. 17/014,089 (11 pages).
U.S. Final Office Action dated Mar. 13, 2023, issued in U.S. Appl. No. 16/901,522 (13 pages).
U.S. Final Office Action dated Mar. 13, 2023, issued in U.S. Appl. No. 17/014,853 (21 pages).
Notice of Allowance for U.S. Appl. No. 16/844,914 dated Dec. 8, 2022, 8 pages.
Notice of Allowance for U.S. Appl. No. 16/901,474 dated Dec. 13, 2022, 10 pages.
Notice of Allowance for U.S. Appl. No. 16/901,538, dated Nov. 23, 2022, 9 pages.
Notice of Allowance for U.S. Appl. No. 16/901,541 dated Dec. 14, 2022, 8 pages.
Notice of Allowance for U.S. Appl. No. 17/014,034 dated Jan. 27, 2023, 7 pages.
Notice of Allowance for U.S. Appl. No. 17/014,900 dated Feb. 13, 2023, 8 pages.
Notice of Allowance for U.S. Appl. No. 17/014,976 dated Dec. 7, 2022, 8 pages.
Office Action for U.S. Appl. No. 17/014,089 dated Dec. 9, 2022, 8 pages.
Chinese Office Action for CN Application No. 202010920922.X dated Jul. 6, 2022, 13 pages.
Chinese Office Action for CN Application No. 202010921351.1 dated Jul. 5, 2022, 9 pages.
Final Office Action for U.S. Appl. No. 16/844,914 dated Jul. 20, 2022, 8 pages.
Final Office Action for U.S. Appl. No. 16/901,527 dated Oct. 4, 2022, 22 pages.
Final Office Action for U.S. Appl. No. 17/014,061 dated Jul. 18, 2022, 16 pages.
Notice of Allowance for U.S. Appl. No. 16/844,914 dated Sep. 28, 2022, 7 pages.
Notice of Allowance for U.S. Appl. No. 16/901,538 dated Sep. 16, 2022, 9 pages.
Notice of Allowance for U.S. Appl. No. 16/901,541 dated Jul. 27, 2022, 8 pages.
Notice of Allowance for U.S. Appl. No. 17/014,900 dated Aug. 30, 2022, 8 pages.
Notice of Allowance for U.S. Appl. No. 17/014,976 dated Aug. 16, 2022, 9 pages.
Office Action for U.S. Appl. No. 16/901,474 dated Aug. 17, 2022, 22 pages.
Office Action for U.S. Appl. No. 16/901,522 dated Oct. 4, 2022, 15 pages.
Office Action for U.S. Appl. No. 17/014,034 dated Oct. 4, 2022, 15 pages.
Office Action for U.S. Appl. No. 17/014,853 dated Oct. 4, 2022, 25 pages.
U.S. Office Action dated Mar. 15, 2023, issued in U.S. Appl. No. 17/014,061 (16 pages).
U.S. Office Action dated Jun. 30, 2023, issued in U.S. Appl. No. 17/014,853 (31 pages).
Chinese Office Action for CN Application No. 202010919375.3 dated Dec. 20, 2023 (with English translation), 19 pages.
Chinese Office Action for CN Application No. 202010919377.2 dated Dec. 20, 2023 (with English translation), 21 pages.
Final Rejection for U.S. Appl. No. 17/014,853 dated Jan. 9, 2024, 37 pages.
US Office Action dated Apr. 4, 2024, issued in U.S. Appl. No. 17/014,853 (32 pages).

* cited by examiner

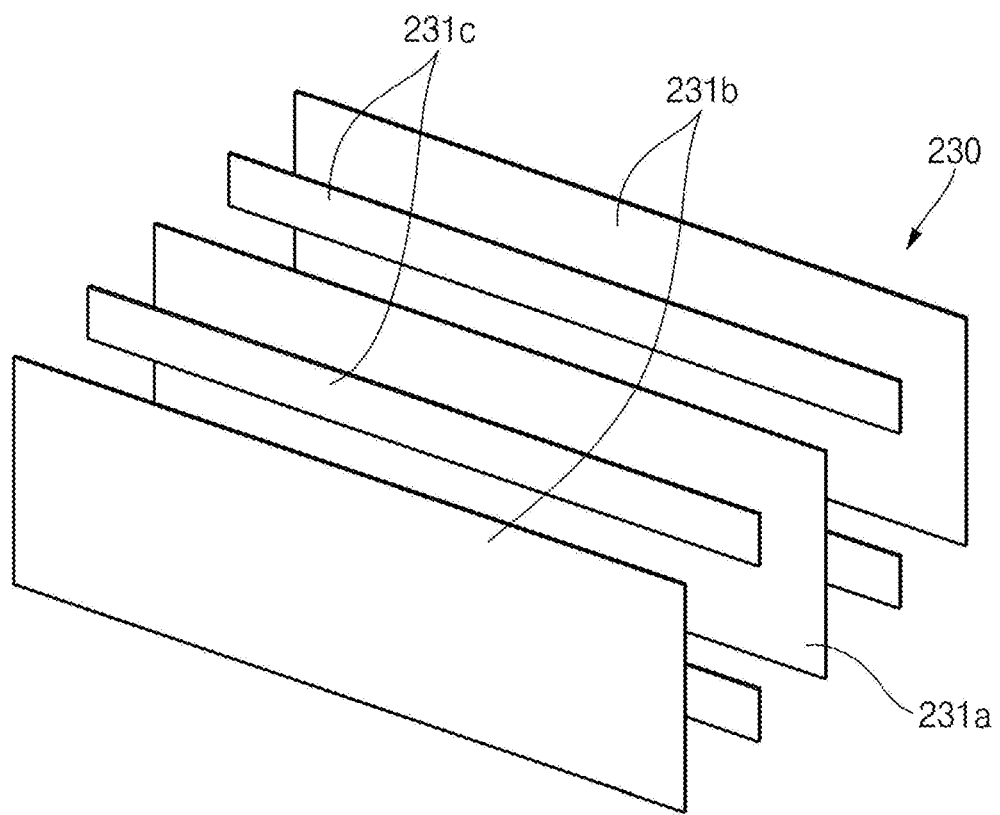

ENERGY STORAGE MODULE

CROSS-REFERENCE TO RELATED APPLICATIONS

This application claims priority to and the benefit of each of Korean Patent Application No. 10-2019-0110367, filed on Sep. 5, 2019 in the Korean Intellectual Property Office, and Korean Patent Application No. 10-2020-0113376, filed on Sep. 4, 2020 in the Korean Intellectual Property Office, the entire content of each of which is herein incorporated by reference.

BACKGROUND

1. Field

Aspects of embodiments of the present disclosure relate to an energy storage module capable of improving safety.

2. Description of the Related Art

An energy storage module may be linked with a renewal energy and power system, such as, for example, a solar cell, to store electric power when demand for the electric power from a load is low, and to use (or discharge or provide) the stored electric power when demand for the electric power is high. The energy storage module generally includes (or is) an apparatus including a large number of battery cells (e.g., secondary batteries or secondary battery cells).

The battery cells are generally received (or accommodated) in multiple trays, which are received in a rack, and multiple racks are received in a container box.

Recently, there have been many cases in which fires occur to energy storage modules. Once a fire occurs to the energy storage module, it is not easy to extinguish the fire due to characteristics of the energy storage module. An energy storage module, including a plurality of battery cells, generally demonstrates high-capacity, high-output characteristics, and research into technology for increasing the safety of the energy storage module is being actively conducted.

SUMMARY

According to an aspect of embodiments of the present disclosure, an energy storage module having improving safety is provided. According to another aspect of embodiments of the present disclosure, an energy storage module exhibiting a reduced fire risk and increased safety by reducing or minimizing the chance of a fire spreading to adjacent battery cells when a fire occurs is provided.

According to one or more embodiments of the present disclosure, an energy storage module includes: a plurality of battery cells arranged in a length direction such that long side surfaces of adjacent ones of the battery cells face one another, each of the battery cells comprising a vent; a plurality of insulation spacers, at least one of the insulation spacers being located between the long side surfaces of an adjacent pair of the battery cells, a cover member including an internal receiving space configured to accommodate the battery cells and the insulation spacers, a top plate coupled to a top portion of the cover member and including ducts respectively corresponding to the vents of the battery cells and including opening holes respectively corresponding to the insulation spacers, a top cover coupled to a top portion of the top plate and including discharge holes located in an exhaust area and respectively corresponding to the ducts, and an extinguisher sheet located between the top cover and the top plate, configured to emit a fire extinguishing agent at a temperature exceeding a certain temperature (e.g. a reference temperature), and including opening holes located to correspond to the ducts, wherein the top cover includes protrusion parts located on a bottom surface of the top cover, covering the exhaust area, and coupled to an exterior of the ducts.

In an embodiment, the extinguisher sheet may include opening holes located to respectively correspond to the ducts.

In an embodiment, the extinguisher sheet may include a receiving space receiving a fire extinguishing agent within an external case made of polyurea and polyurethane.

In an embodiment, the receiving space may include one or more capsules or tubes.

In an embodiment, the fire extinguishing agent may include a halogenated carbon compound.

In an embodiment, the extinguisher sheet may include different types of sheets configured to emit the fire extinguishing agent at different temperatures.

In an embodiment, a ratio of the weight of the fire extinguishing agent in the extinguisher sheet to a total weight of the extinguisher sheet may be from 30% to 50%.

In an embodiment, an amount of the fire extinguishing agent in the extinguisher sheet may be from 0.12 g/cm$^3$ to 0.82 g/cm$^3$.

In an embodiment, the top cover may further include an inclined part having a thickness gradually increasing toward the protrusion part in the exhaust area.

In an embodiment, a top end of the duct may be lower than the inclined part.

In an embodiment, a space may be defined between the duct and the protrusion part, and some of the gas discharged from the vent may pass through the duct to be discharged to the space through the inclined part.

In an embodiment, the duct may have an inner diameter gradually decreasing upward.

In an embodiment, a portion of the exhaust area may extend into the interior of the duct.

In an embodiment, the exhaust area may have a smaller thickness than the top cover.

In an embodiment, the exhaust area may protrude downwardly from the top cover.

In an embodiment, an area of the discharge holes may be greater than or equal to about 30% of that of the exhaust area.

In an embodiment, an insulation spacer of the plurality of insulation spacers may include a heat-insulating first sheet and a plurality of flame-retardant second sheets respectively adhered to opposite surfaces of the first sheet by an adhesion member.

In an embodiment, the first sheet may include ceramic paper, and the second sheets may include mica paper.

In an embodiment, the first sheet may include a ceramic fiber including an alkali alkaline earth metal.

In an embodiment, the long side surfaces of adjacent ones of the battery cells may be spaced apart from each other by a first distance, and a thickness of each of the insulation spacers may be less than 50% of the first distance.

In an embodiment, each of the insulation spacers may have a width-direction size less than twice a height-direction size thereof, and the first sheet may be adhered to the second sheets at opposite ends thereof by the adhesion member.

In an embodiment, the insulation spacers may further include an edge part comprising a plastic material, and the edge part may be formed at peripheral edges of the first and second sheets by insert molding.

In an embodiment, the first sheet and the second sheets may be spaced apart from each other at central portions thereof to define air passages.

In an embodiment, a width-direction size of the insulation spacers may be greater than twice a height-direction size thereof, and the first sheet and the second sheets may be adhered to each other by the adhesion member applied to a region adjacent top and bottom ends of each of the first sheet and the second sheets.

At least some of the above and other features of the invention are set out in the claims.

BRIEF DESCRIPTION OF DRAWINGS

FIGS. 22A and 22B are a perspective view and an exploded perspective view, respectively, illustrating configurations of insulation spacers in the energy storage module shown in FIGS. 17 to 21.

DESCRIPTION OF REFERENCE NUMERALS

Figure 1:
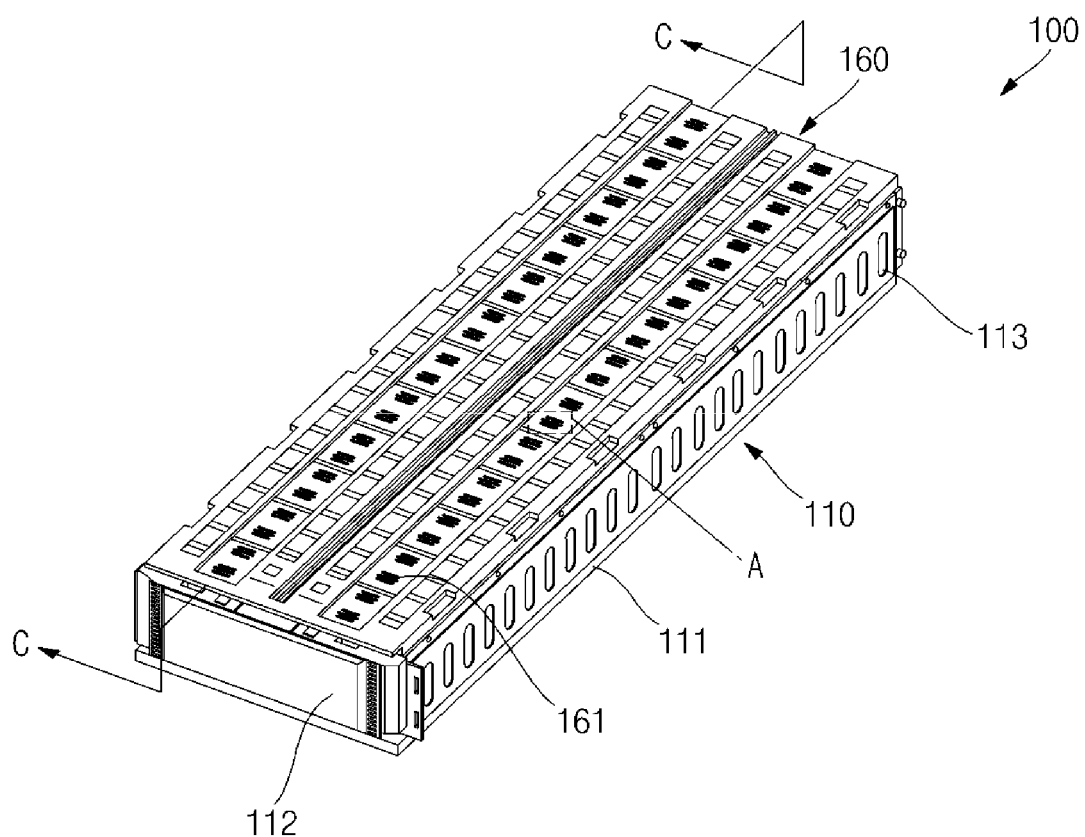
FIG. 1 is a perspective view of an energy storage module according to an embodiment of the present disclosure.

| | |
|---|---|
| 100, 200: Energy storage module | 110, 210: Cover member |
| 120: Battery cell | 130: Insulation spacer |
| 131: Sheet part | 132: Edge part |
| 140: Top plate | 141: Duct |
| 143: Opening hole | |
| 150, 150A, 150B, 150C: Extinguisher sheet | |
| 151: Opening hole | 152, 152A, 152B: Receiving space |
| 160: Top cover | |

DETAILED DESCRIPTION

Herein, some example embodiments of the present disclosure will be described in further detail. The subject matter of the present disclosure, however, may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components may be exaggerated for brevity and clarity. Like numbers refer to like elements throughout. As used herein, the term "and/or" includes any and all combinations of one or more of the associated listed items. In addition, it is to be understood that when an element A is referred to as being "connected to" an element B, the element A may be directly connected to the element B or one or more intervening elements C may be present therebetween such that the element A and the element B are indirectly connected to each other.

The terminology used herein is for the purpose of describing particular embodiments and is not intended to be limiting of the disclosure. As used herein, the singular forms are intended to include the plural forms as well, unless the context clearly indicates otherwise. It is to be further understood that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It is to be understood that, although the terms "first," "second," etc. may be used herein to describe various members, elements, regions, layers, and/or sections, these members, elements, regions, layers, and/or sections should not be limited by these terms. These terms are used to distinguish one member, element, region, layer, and/or section from another. Thus, for example, a first member, a first element, a first region, a first layer, and/or a first section discussed below could be termed a second member, a second element, a second region, a second layer, and/or a second section without departing from the teachings of the present disclosure.

Spatially relative terms, such as "beneath," "below," "lower," "above," "upper," and the like may be used herein for ease of description to describe one element or feature's relationship to another element(s) or feature(s) as illustrated in the figures. It is to be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, for example, the term "below" can encompass both an orientation of above and below.

Unless otherwise defined, all terms (including technical and scientific terms) used herein have the same meaning as commonly understood by one of ordinary skill in the art to which this disclosure belongs. It is to be further understood that terms, such as those defined in commonly used dictionaries, should be interpreted as having a meaning that is consistent with their meaning in the context of the relevant art and are not to be interpreted in an idealized or overly formal sense unless expressly so defined herein.

Herein, a configuration of an energy storage module according to an embodiment of the present disclosure will be described.

Figure 2:
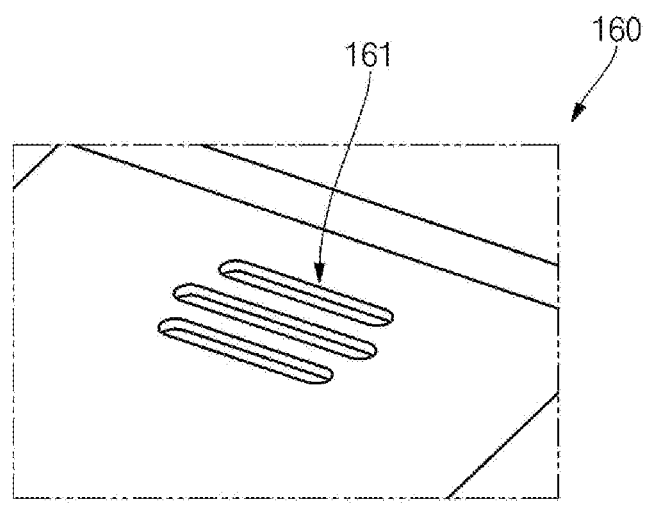
FIG. 2 is an enlarged view of a region "A" of FIG. 1.
Figure 3:
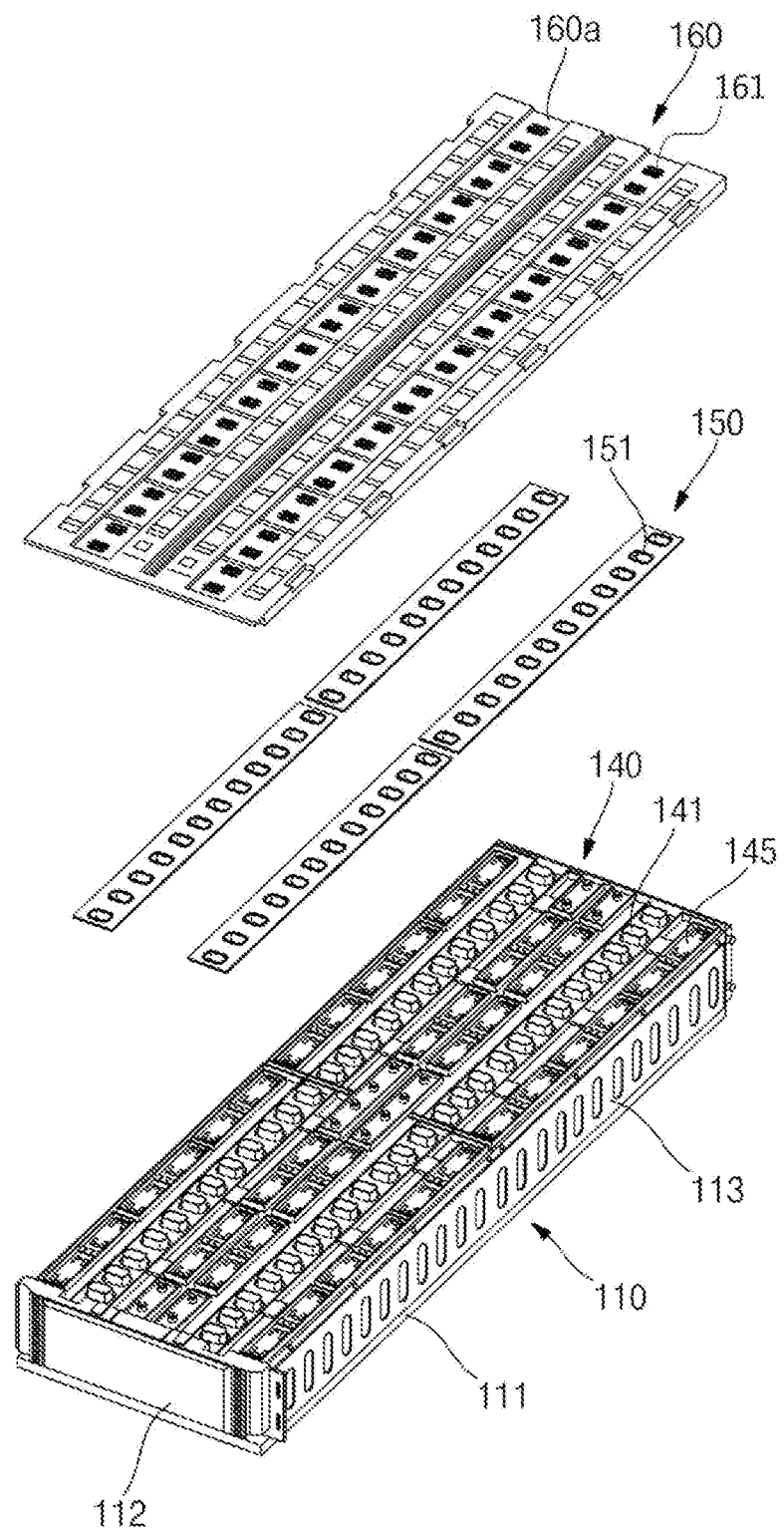
FIG. 3 is an exploded perspective view of the energy storage module shown in FIGS. 1 and 2.
Figure 4:
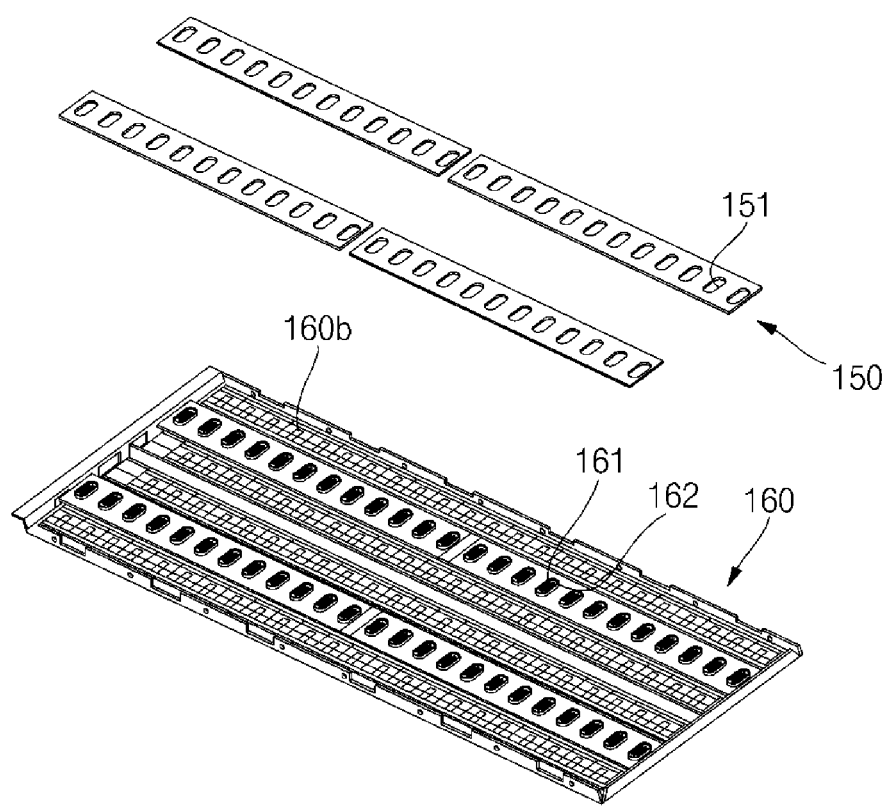
FIG. 4 is an exploded bottom perspective view of an extinguisher sheet and a top cover in the energy storage module shown in FIGS. 1 to 3.

FIG. 1 is a perspective view of an energy storage module according to an embodiment of the present disclosure; FIG. 2 is an enlarged view of a region "A" of FIG. 1; FIG. 3 is an exploded perspective view of the energy storage module shown in FIGS. 1 and 2; and FIG. 4 is an exploded bottom perspective view of an extinguisher sheet and a top cover in the energy storage module shown in FIGS. 1 to 3.

Referring to FIGS. 1 to 4, an energy storage module 100 according to an embodiment of the present disclosure includes a cover member 110, a top plate 140, an extinguisher sheet 150, and a top cover 160.

The cover member 110 provides an internal space for receiving (or accommodating) battery cells and insulation spacers. In an embodiment, the cover member 110 includes a bottom plate 111, an end plate 112, and a side plate 113 which together form a space for arranging the battery cells and the insulation spacers. In addition, the cover member 110 may fix positions of the battery cells and the insulation spacers and may protect the battery cells from external impacts.

The top plate 140 is coupled to a top portion (e.g., a top surface or a top) of the cover member 110. The top plate 140 may be coupled to the cover member 110 while covering top portions (e.g., top surfaces) of the battery cells. In an embodiment, the positive electrode terminals and negative electrode terminals of the battery cells are exposed to (or through) the top plate 140, and bus bars 145 are coupled to the respective terminals, thereby connecting the battery cells to one another in series, in parallel, or in series/parallel.

The top plate 140 includes a plurality of ducts 141 located to respectively correspond to vents, which are located on the top surface of each of the battery cells. The ducts 141 may be arranged in a direction, for example, in a length direction of the top plate 140. Accordingly, the gas discharged from the vent of one of the battery cells may move upwardly along a corresponding one of the ducts 141 of the top plate 140. The configuration and operation of the ducts 141 will be described in further detail below.

The extinguisher sheet 150 is positioned between the top plate 140 and the top cover 160. The extinguisher sheet 150 may be provided as one or more members (or sheets) extending in a direction, for example, in a length direction of the top plate 140. In addition, the extinguisher sheet 150 may include openings (e.g., opening holes) 151 positioned to respectively correspond to the ducts 141 of the top plate 140. Accordingly, the extinguisher sheet 150 may be positioned such that the openings 151 therein are respectively aligned with the ducts 141 of the top plate 140. In addition, the extinguisher sheet 150 may be coupled to a bottom surface 160b of the top cover 160. Because the extinguisher sheet 150 is coupled to the bottom surface 160b of the top cover 160, the extinguisher sheet 150 may be positioned above the top plate 140. The configuration and operation of the extinguisher sheet 150 will be described below in further detail.

The top cover 160 is coupled to the top portion of the top plate 140. The top cover 160 may cover the top plate 140 and the bus bar 145. The top cover 160 also covers the extinguisher sheet 150, which is coupled to the bottom surface 160b of the top cover 160, thereby protecting the top plate 140, the bus bar 145, and the extinguisher sheet 150 from external impacts applied to a top surface 160a of the top cover 160. In addition, the top cover 160 includes discharge openings (e.g., discharge holes) 161. In an embodiment, the top cover 160 may include protrusion parts (e.g., protrusions) 162 spaced by a distance (e.g., a predetermined distance) apart from an outer periphery of (e.g., may extend around a periphery of) respective ones of the discharge holes 161, and the protrusion parts 162 downwardly protrude from the top cover 160. Openings (e.g., opening holes) 151 of the extinguisher sheet 150 may be coupled to (e.g., may extend around) an exterior of the respective ones of the protrusion part 162, and the ducts 141 may be coupled to (e.g., may extend into) the interior of the respective ones of the protrusion parts 162. In an embodiment, the discharge holes 161 may each include a plurality of discharge holes (e.g., discharge sub-holes) arranged in a direction, for example, in a length direction, of the top cover 160. In addition, the discharge holes 161 are positioned to respectively correspond to the ducts 141 of the top plate 140. In an embodiment, the discharge holes 161 may each be provided as a plurality of openings passing through the top and bottom surfaces of the top plate 140 and spaced apart from one another. Accordingly, the gases discharged from a vent 124a of a battery cell 120 when the vent 124a ruptures may be discharged to the exterior through the corresponding duct 141 of the top plate 140, and the corresponding discharge hole 161 of the top cover 160 and may facilitate user safety by preventing or substantially preventing a user's hand from contacting an internal structure of the top cover 160.

In an embodiment, as will be described below, a rack includes a plurality of shelves and a plurality of the energy storage modules 100 accommodated on the shelves. For example, the rack may include a plurality of shelves mounted thereon to be spaced apart from one another, and one or more energy storage modules 100 may be accommodated in each of the plurality of shelves. In an embodiment, a bottom surface of one of the energy storage modules 100 may contact a top surface of one of the shelves, and a bottom surface of another one of the energy storage modules 100 may be positioned on the top surface of another shelf while being spaced a distance apart from the top surface thereof.

Herein, the coupling relationship between the duct 141 of the top plate 140 and the top cover 160 in the energy storage module 100 according to an embodiment of the present disclosure will be described in further detail.

Figure 5:
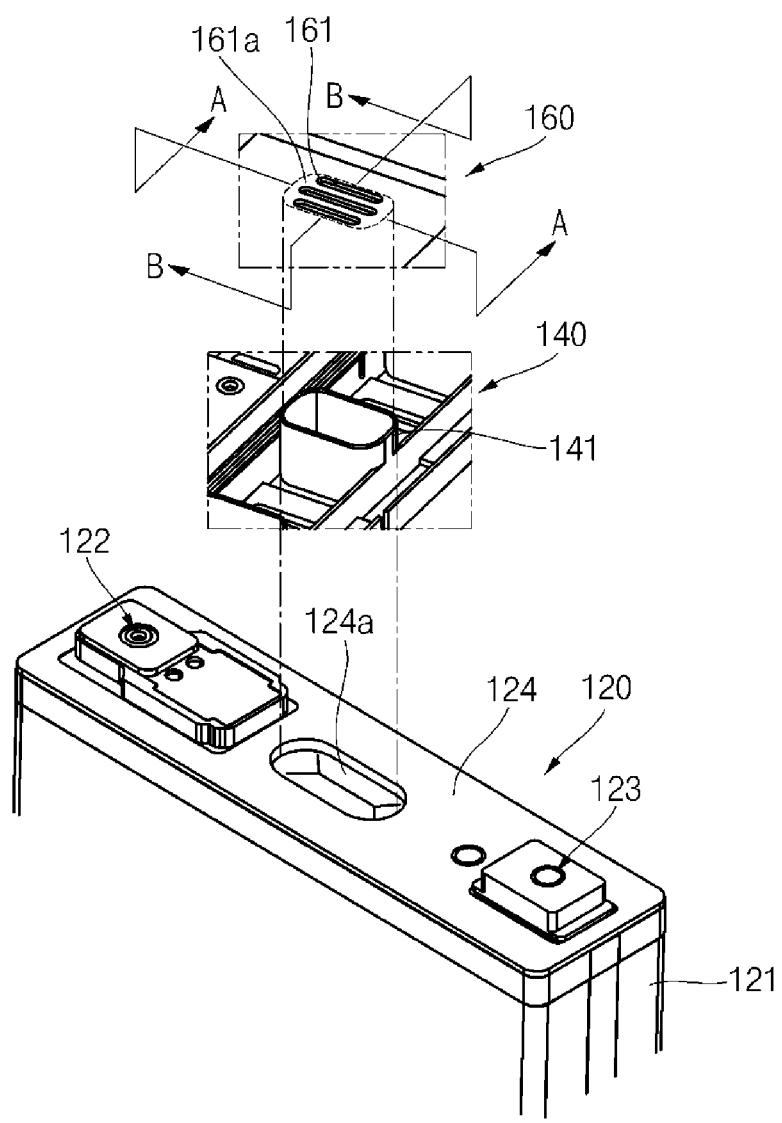
FIG. 5 is a perspective view illustrating a secondary battery, a top plate, and a top cover in the energy storage module shown in FIGS. 1 to 4.
Figure 6A:
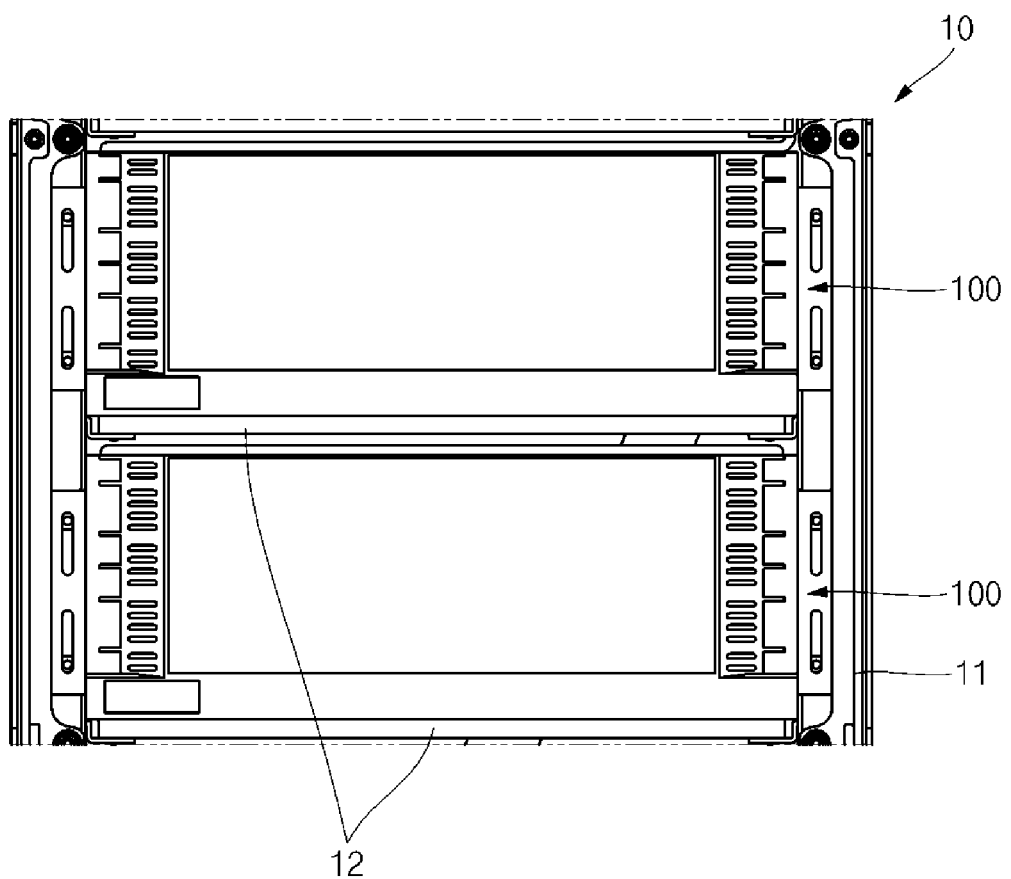
FIG. 6A illustrates a rack on which a plurality of energy storage modules are coupled according to an embodiment of the present disclosure.
Figure 6B:
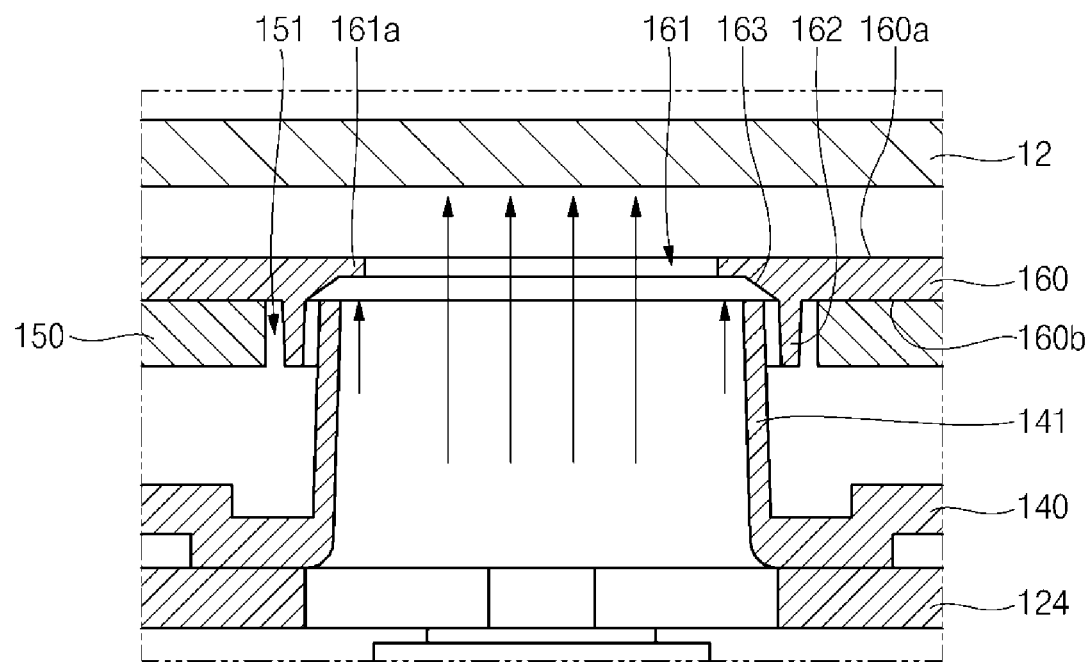
FIG. 6B is a cross-sectional view taken along the line A-A of FIG. 5.
Figure 6C:
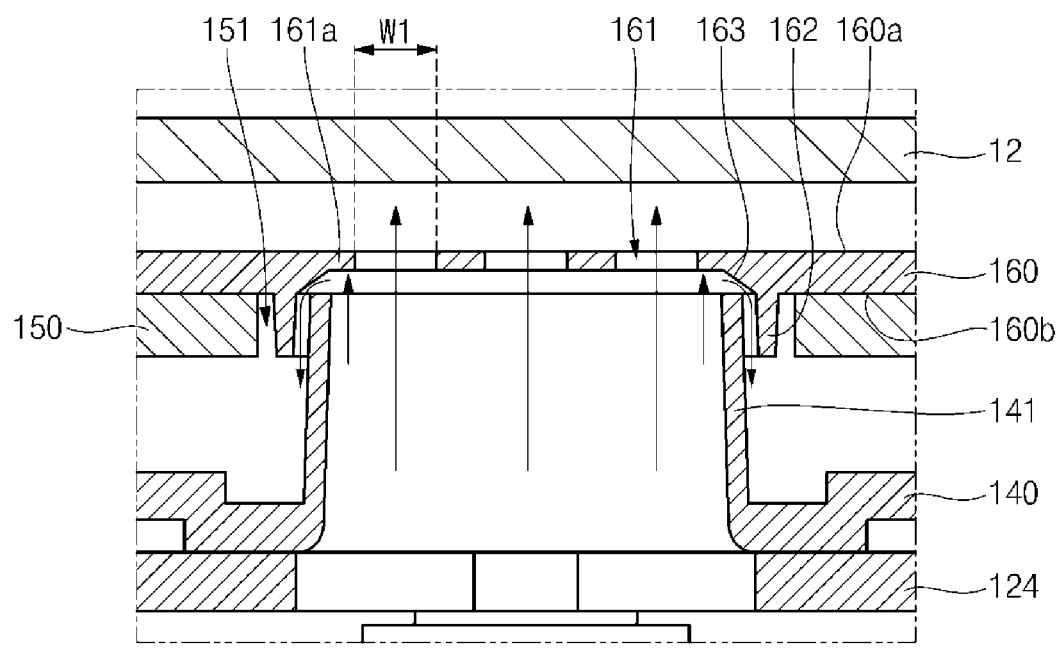
FIG. 6C is a cross-sectional view taken along the line B-B of FIG. 5.
Figure 6D:
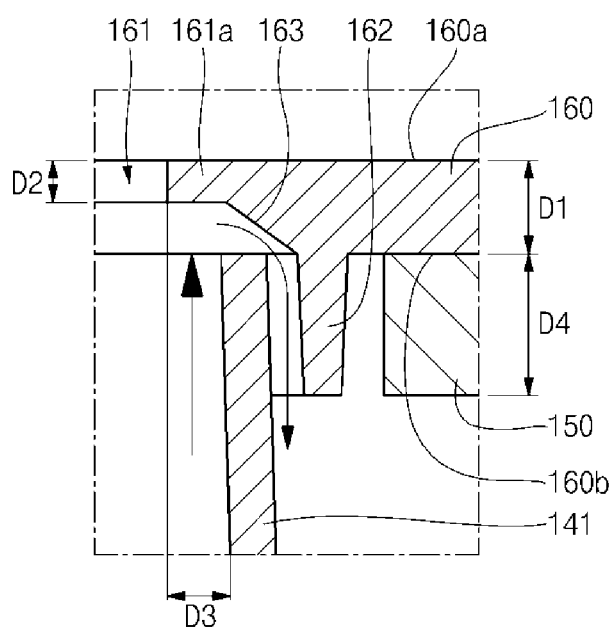
FIG. 6D is an enlarged view of a region of FIG. 6B.
Figure 7:
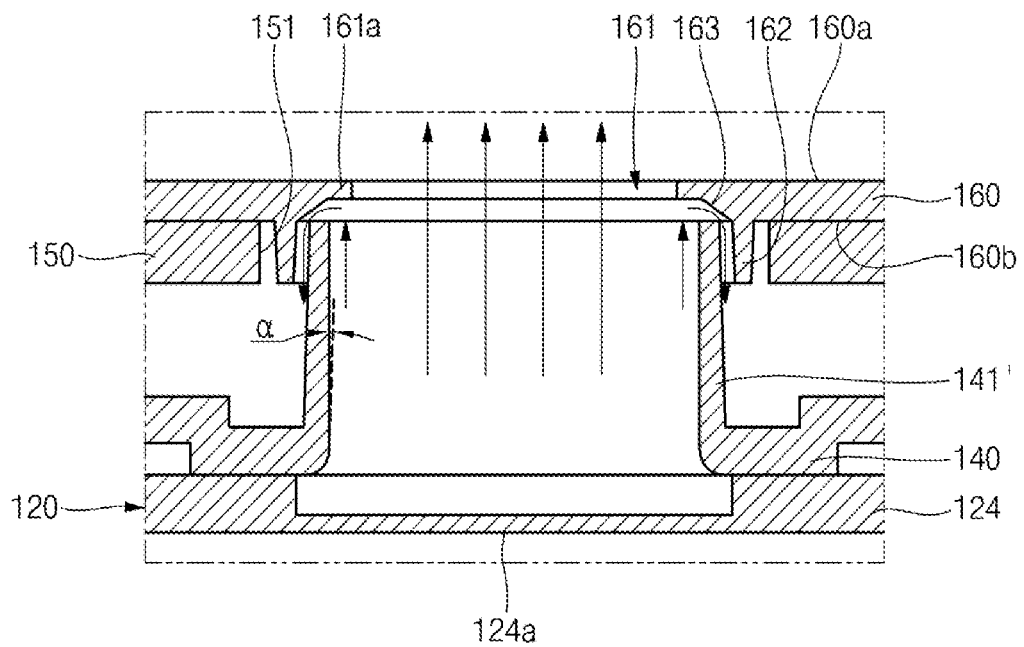
FIG. 7 is a cross-sectional view of a duct according to an embodiment of the present disclosure.

FIG. 5 is a perspective view illustrating a secondary battery, a top plate, and a top cover in the energy storage module shown in FIGS. 1 to 4. FIG. 6A illustrates a rack on which a plurality of energy storage modules are coupled according to an embodiment of the present disclosure; FIG. 6B is a cross-sectional view taken along the line A-A of FIG. 5, FIG. 6C is a cross-sectional view taken along the line B-B of FIG. 5; and FIG. 6D is an enlarged view of a region of FIG. 6B. FIG. 7 is a cross-sectional view of a duct according to an embodiment of the present disclosure.

Referring to FIG. 5, the ducts 141 located on the top plate 140 respectively correspond to vents 124a of the battery cells 120, and discharge holes 161 of the top cover 160 may be positioned to respectively correspond to the ducts 141 of the top plate 140.

In an embodiment, each of the battery cells 120 includes an electrode assembly accommodated in a case 121 and is shaped such that the cap plate 124 covers a top portion of the case 121. The electrode assembly may be configured by winding, stacking, or laminating a positive electrode plate and a negative electrode plate, each having a portion coated with an active material (e.g., a coating or coated portion), in a state in which a separator is positioned between the positive electrode plate and the negative electrode plate. A top portion of the case 121 may be sealed by a cap plate 124. In an embodiment, the vent 124a is located at approximately a center of the cap plate 124 and has a smaller thickness than other regions of the cap plate 124. In addition, first and second electrode terminals 122 and 123, which are electrically connected to the electrode terminal may be positioned at opposite sides of the cap plate 124. For the sake of convenience, in the following description, the first electrode terminal 122 will be referred to as a negative electrode terminal, and the second electrode terminal 123 will be referred to as a positive electrode terminal, but the polarities thereof may be reversed. Occurrences of ignition of the battery cells 120 can be reduced by using particular compositions of active materials of the battery cells 120, thereby increasing safety.

Referring to FIG. 6A, the energy storage module 100 according to an embodiment of the present disclosure may include a plurality of the energy storage modules 100 coupled to a rack 10. The number of energy storage modules 100 may be varied according to a desired capacity, and the energy storage modules 100 may be mounted in the rack 10 and then fixed thereto. The rack 10 may include a frame 11 defining an overall external shape of the rack 10, and shelves 12 at different levels of the frame 11 to support bottom portions (e.g., bottom surfaces) of the energy storage modules 100. In FIG. 6A, two shelves 12 are shown in the frame 11 with energy storage modules 100 respectively mounted on the shelves 12, but the present disclosure is not limited to the numbers in the illustrated embodiment.

The ducts 141 are passages through which the gas discharged through the vents 124a of the battery cells 120 passes, and protrude from the top plate 140. In an embodiment, the duct 141 may have a cross-sectional shape, e.g., an elliptical shape, corresponding to the vent 124a of each of the battery cells 120. In an embodiment, the duct 141 may taper away from a bottom portion thereof with the inner diameter thereof gradually decreasing upward. In some embodiments, the duct 141 may have a uniform thickness and may be inclined at an angle (e.g. a predefined angle) (a) toward an interior thereof. In an embodiment, to allow the gas to be efficiently discharged without intruding in a working range of the vent 124a of the battery cell 120, the angle (a) of inclination of the duct 141 may be in a range from about 1° to about 5°, and, in an embodiment, from about 1° to about 3°.

In an embodiment, to effectively discharge the gas discharged through the vent 124a of the battery cell 120, the duct 141 may have a height corresponding to that of the top cover 160. In an embodiment, a height of the duct 141 may be in a range from 15 mm to 20 mm, and, in an embodiment, from 18 mm to 18.4 mm. When the height of the duct 141 is greater than or equal to 15 mm, the gas generated from the vent 124a of the battery cell 120 can be prevented or substantially prevented from returning to the vent 124a even if the gas collides with the shelf 12 after moving along the duct 141. In addition, when the height of the duct 141 is less than or equal to 20 mm, the duct 141 configured relative to the shelf 12 may be easily manufactured. In an embodiment, because the duct 141 has a height corresponding to that of the top cover 160, the gas passing through the duct 141 may move toward the discharge hole 161 of the top cover 160.

As shown in FIG. 7, a duct 141' according to another embodiment of the present disclosure may taper away from a bottom portion thereof with the inner diameter thereof gradually decreasing upward. In an embodiment, the duct 141' may be configured to have a thickness gradually decreasing from a bottom portion thereof to a top portion thereof. In an embodiment, an interior surface of the duct 141' may be gradually upwardly inclined with an angle (e.g., a predefined angle) (a) to the exterior, and the exterior surface of the duct 141' may be gradually upwardly inclined with a an angle (e.g., a predefined angle) to the interior. In an embodiment, to make the gas efficiently discharged without intruding in a working range of the vent 124a of the battery cell 120, an inclination angle of the interior of the duct 141' may be in a range from about 1° to about 5°, and, in an embodiment, from about 1° to about 3°. When the inclination angle is greater than or equal to 1°, the gas generated from the vent 124a of the battery cell 120 can be easily accumulated upwardly. When the inclination angle is less than or equal to 5°, rigidity of the duct 141' can be maintained and upward movement of the gas may be prevented or substantially prevented from being restricted by the duct 141'.

Referring to FIGS. 6A to 6D, in an embodiment, the top cover 160 may include an exhaust area 161a having a plurality of discharge openings (e.g., discharge holes) 161 located therein, protrusion parts (e.g., protrusions) 162 located on a bottom surface of the top cover 160, and an inclined part 163 located between the exhaust area 161a and each of protrusion parts 162. The exhaust area 161a is positioned on a top portion of the duct 141 and can be defined by a region forming peripheries around the discharge holes 161. In an embodiment, the exhaust area 161a may have a thickness D2 smaller than a thickness D1 of the top cover 160 (D1>D2). In an embodiment, the thickness D2 of the exhaust area 161a may be two thirds (⅔) the thickness D1 of the top cover 160. In addition, the thickness D2 of the exhaust area 161a may be at least 1.0 mm. In this case, injection molding can be properly performed while minimizing or reducing occurrence of flames when the gas is discharged. For example, when the thickness D1 of the top cover 160 is about 2.5 mm, the thickness D2 of the exhaust area 161a may be about 1.5 mm.

In addition, the gas discharged through the vent 124a of the battery cell 120 can be exhausted through the discharge holes 161 located in the exhaust area 161a. In FIG. 6C, three discharge holes 161 are shown, but the present disclosure is not limited to the number in the illustrated embodiment. In an embodiment, the plurality of discharge holes 161 may have an overall area of greater than or equal to about 30% of the exhaust area 161a, thereby facilitating exhaust performance. In an embodiment, a width W1 of each of the discharge holes 161 may be less than 3 mm. When the width W1 of the discharge hole 161 is less than or equal to 3 mm, internal flames can be prevented or substantially prevented from spreading to the exterior and facilitating user safety by preventing or substantially preventing a user's hand from directly contacting the battery cell from the exterior of the top cover 160.

The discharge holes 161 are positioned within the ducts 141, and top ends of the ducts 141 are covered by the exhaust area 161a. In some embodiments, regions of the exhaust area 161a, where the discharge holes 161 are not located, may extend into the interior of the ducts 141, as shown in FIG. 6C. In an embodiment, a distance D3 of the exhaust area 161a extending into the interior of each of the ducts 141 may be less than or equal to about 2 mm, and, in an embodiment, in a range from 1 mm to 1.5 mm.

The protrusion parts 162 protrude from the bottom surface 160b of the top cover 160 and are coupled to the exterior of the ducts 141. The protrusion parts 162 may be shaped to respectively correspond to cross-sections of the ducts 141 and may cover (e.g. surround) the exhaust area 161a. In an embodiment, a cross-sectional area of each of the protrusion parts 162 is greater than that of each of the ducts 141, such that a space may be created between each of the ducts 141 and each of the protrusion parts 162. Some of the gas discharged through the vent 124a of the battery cell 120 may collide with the exhaust area 161a positioned above the duct 141 to then move toward the space. In an embodiment, a height D4 of each of the protrusion parts 162 may be in a range from about 2 mm to about 4 mm, and, in an embodiment, 3 mm. If the height of the protrusion part 162 is less than 2 mm, the protrusion part 162 may not be high enough to guide the gas colliding with the exhaust area 161a to the exterior of the duct 141. If the height of the protrusion part 162 is greater than 4 mm, the protrusion part 162 may be positioned excessively high, making it difficult to efficiently discharge the gas. In an embodiment, a ratio of the height D4 of the protrusion parts 162 to the height of the duct 141 may be in a range from about 1:4 to about 1:9, and, in an embodiment, 1:6. When the ratio of the height D4 of the protrusion parts 162 to the height of the duct 141 is greater than or equal to 1:4, the protrusion part 162 can be manufactured so as to easily cover the top portion of the duct 141. When the ratio of the height D4 of the protrusion parts 162 to the height of the duct 141 is less than or equal to 1:9, the gas passing through the duct 141 can be easily guided upwardly.

The inclined part 163 is positioned between the exhaust area 161a and the protrusion part 162. In an embodiment, since the exhaust area 161a having a relatively small thickness is connected to the protrusion part 162 in the top cover 160, the inclined part 163 is inclined. In some examples, the inclined part 163 may be configured to have a thickness gradually increasing toward the protrusion part 162 in the exhaust area 161a. The top end of the duct 141 is positioned at a bottom portion of the inclined part 163 (e.g., the top end of the duct 141 is lower than the inclined part 163). The inclined part 163 may prevent or substantially prevent the gas discharged through the vent 124a of the battery cell 120 from penetrating back into the vent 124a. For example, even if the gas discharged through the vent 124a of the battery cell 120 collides with the exhaust area 161a extending into the interior of the duct 141 while upwardly moving along the duct 141, the gas may be discharged to the exterior of the duct 141 along the inclined part 163 and the protrusion part 162. Therefore, the gas can be prevented or substantially prevented from penetrating back into the vent 124a of the battery cell 120, thereby improving safety of the energy storage module 100. In an embodiment, the inclined part 163 may have a slope in a range from about 30° to about 60°, and, in an embodiment, from about 40° to about 50°, with respect to the exterior surface of the duct 141. When the slope of the inclined part 163 with respect to the exterior surface of the duct 141 is greater than or equal to 30°, the gas discharged through the vent 124a is allowed to be discharged to the exterior, thereby easily preventing or substantially preventing the gas from penetrating back into the vent 124a. When the slope of the inclined part 163 with respect to the exterior surface of the duct 141 is less than or equal to 60°, the inclined part 163 can be integrated with the protrusion part 162.

As shown in FIGS. 6A to 6D, if the vent 124a of the battery cell 120 ruptures, the gas moves upwardly along the duct 141, as indicated by the arrows. In FIGS. 6B and 6C, the vent 124a remaining in the cap plate 124 is shown. However, if the gas is internally generated, the vent 124a ruptures and may then be removed. In an embodiment, after some of the discharged gas collides with the exhaust area 161a extending into the interior of the duct 141, the gas moves along the inclined part 163 and the protrusion part 162. In addition, the gas passing through the duct 141 may move toward the exterior through the discharge holes 161 of the top cover 160 positioned above the duct 141. By another shelf 12 of the rack 10, which supports another energy storage module 100, the gas accumulates between the top surface 160a of the top cover 160 and an adjacent shelf 12 (e.g. the gas may accumulate between the top surface 160a of the top cover 160 and an adjacent shelf 12 to create an inert gas atmosphere). In an embodiment, a distance between the top surface 160a of the top cover 160 and the adjacent shelf 12 may be in a range from about 3 mm to about 7 mm. When the distance is greater than or equal to about 3 mm, the heat generated from the energy storage module 100 can be easily discharged to the exterior. When the distance is less than or equal to about 7 mm, a high-temperature inert gas atmosphere can be easily created, which will be further described below.

In an embodiment, when a gas begins to be discharged from a battery cell 120 through the vent 124a, a phase change may begin to occur in a fire extinguishing agent in the extinguisher sheet 150 at a temperature in a range from about 40° C. to about 60° C., and, in an embodiment, at a temperature in a range from 45° C. to 55° C. However, even in this case, the fire extinguishing agent may remain inside the extinguisher sheet 150 instead of being sprayed (released) therefrom. In an embodiment, when, afterwards, the amount of gas discharged through the vent 124a gradually increases and a temperature around the vent 124a rises and reaches a temperature in a range from about 120° C. to about 200° C., and, in an embodiment, a temperature in a range from about 130° C. to 190° C., and, in an embodiment, a temperature in a range from 140° C. to 180° C., a gas containing an electrolytic steam may be generated mainly through the vent 124a. Also, the gas in the above temperature range may allow a heat-resistant plastic constituting the top plate 140 and the top cover 160 to remain unmelted. In addition, spraying of some of the fire extinguishing agent may begin. In an embodiment, the inclined part 163 of the top cover 160 may prevent or substantially prevent the initially generated combustible gas having a relatively low temperature from being induced into the vent. However, if the separator melts due to a further increase in the internal temperature of the battery cell 120, high-temperature inert gas may be generated with flames. As described above, the inert gas may fill a space between the top surface 160a of the top cover 160 and the adjacent shelf 12 to create an inert gas atmosphere. In addition, the inert gas may also fill the internal space of the duct 141, thereby preventing or substantially preventing oxygen induction, and preventing or substantially preventing flames generated in the battery cell 120 from being propagated to neighboring battery cells 120 or another energy storage module. In addition, the extinguisher sheet 150, which is positioned under the top cover 160, may operate in response to the high-temperature inert gas to emit or spray the fire extinguishing agent, which will be described in further detail below.

Herein, the configuration and operation of the extinguisher sheet 150 of the energy storage module 100 according to an embodiment of the present disclosure will be described.

Figure 8A:
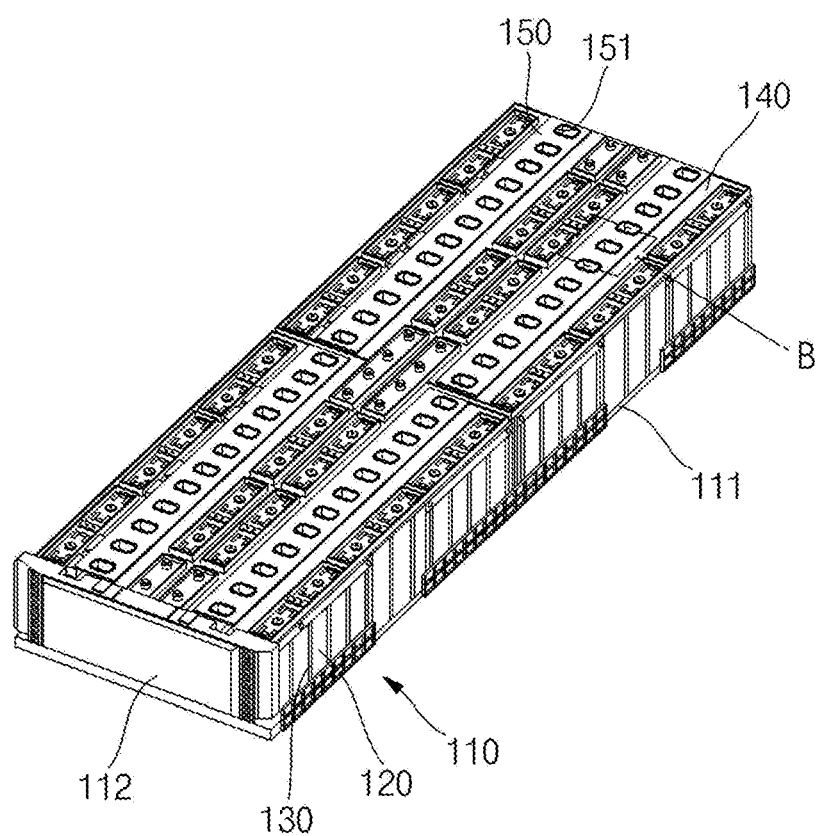
FIG. 8A is a perspective view of the extinguisher sheet coupled to the top plate of the energy storage module shown in FIGS. 1 to 3.
Figure 8B:
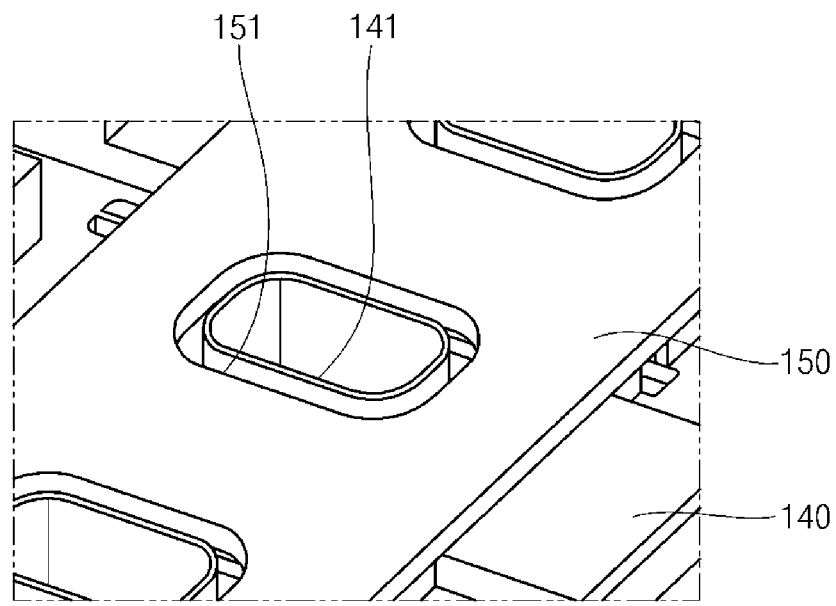
FIG. 8B is an enlarged view of a region "B" of FIG. 8A.
Figure 9A:
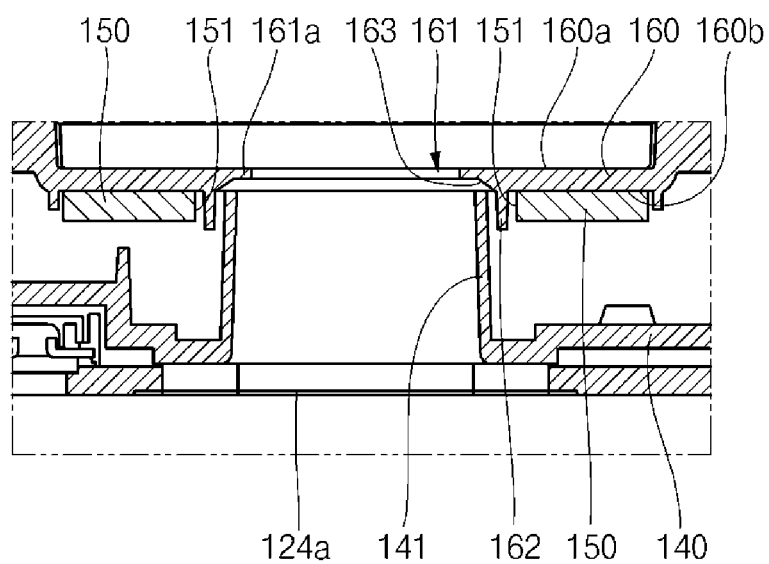
FIGS. 9A and 9B are cross-sectional views illustrating a state in which an extinguisher sheet operates in the energy storage module shown in FIGS. 1 to 3.
Figure 9B:
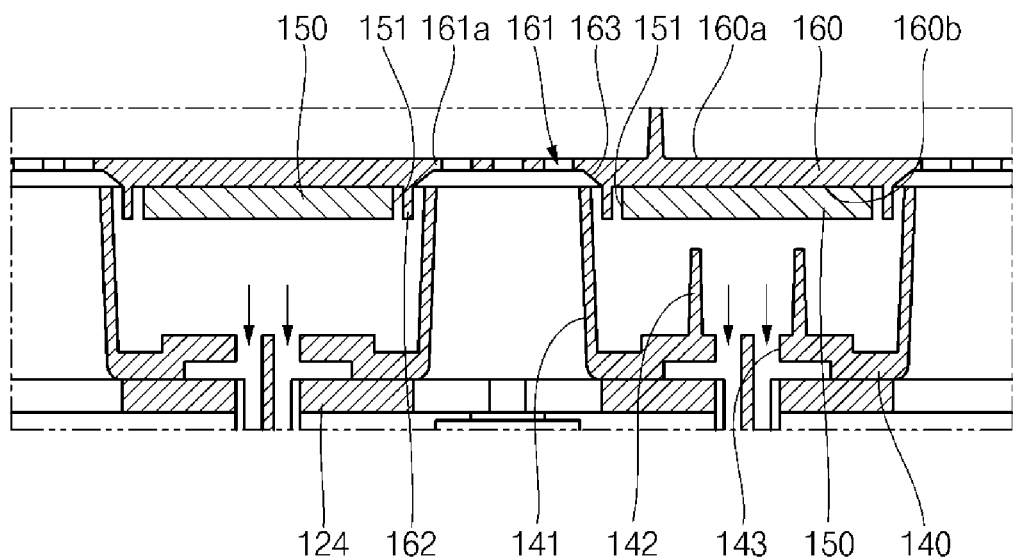

FIG. 8A is a perspective view of the extinguisher sheet coupled to the top plate of the energy storage module shown in FIGS. 1 to 3; and FIG. 8B is an enlarged view of a region "B" of FIG. 8A. FIGS. 9A and 9B are cross-sectional views illustrating a state in which an extinguisher sheet operates in the energy storage module shown in FIGS. 1 to 3. FIGS. 10A to 10D are cross-sectional views illustrating some example configurations of extinguisher sheets in the energy storage module according to embodiments of the present disclosure.

Referring to FIGS. 8A and 8B, the extinguisher sheet 150 is positioned between the top plate 140 and the top cover 160, as described above. As shown in FIG. 8A, the extinguisher sheet 150 may have opening holes 151 coupled to the ducts 141 of the top plate 140. Accordingly, movement of the gases through the ducts 141 may not be influenced by the extinguisher sheet 150.

In addition, referring to FIGS. 9A and 9B, the extinguisher sheet 150 may operate (e.g., may emit the fire extinguishing agent) in response to heat when the inert gas having a relatively high temperature of, for example, about 200° C., is generated. The fire extinguishing agent contained in the extinguisher sheet 150 is emitted by (e.g., is sprayed from) the extinguisher sheet 150 in response to the high-temperature gas. In addition, because a top portion of the extinguisher sheet 150 is covered by the top cover 160, the fire extinguishing agent may be directionally emitted (or sprayed) toward a direction away from the bottom surface 160b of the top cover 160. In addition, the fire extinguishing agent may reach the underlying insulation spacers through openings (e.g., fire extinguishing agent openings or opening holes) 143 located between adjacent ones of the ducts 141 of the top plate 140. In an embodiment, a fluid guide protrusion 142 may further be provided around the openings 143, thereby efficiently guiding the movement of the fire extinguishing agent toward the insulation spacers. As will be further described below, after reaching the insulation spacers, the fire extinguishing agent may move along surfaces of the insulation spacers, thereby extinguishing a fire on a battery cell 120 and cooling the battery cell 120.

Figure 10A:
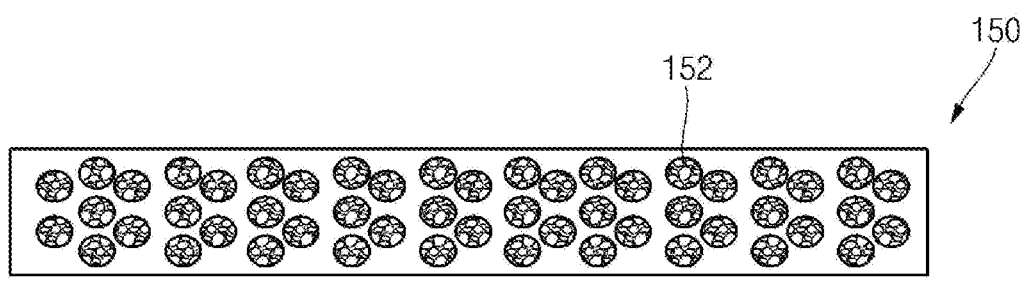
FIGS. 10A to 10D are views illustrating some example configurations of extinguisher sheets in the energy storage module according to an embodiment of the present disclosure.

The extinguisher sheet 150 may include any of various example types of extinguisher sheets, as shown in FIGS. 10A to 10D. In an embodiment, for example, as shown in FIG. 10A, the extinguisher sheet 150 may include receiving parts 152 for receiving (e.g., accommodating or storing) a fire extinguishing agent within an external case made of polyurea and polyurethane. In an embodiment, the receiving parts 152 of the extinguisher sheet 150 may be in forms of micro-sized capsules capable of encapsulating the internal fire extinguishing agent, which includes a halogenated carbon compound (e.g., a halogen-containing hydrocarbon compound, such as a compound consisting only of carbon and halogen atoms), such as, for example, a halogenated ketone based fire extinguishing agent (e.g., NOVEC®, a registered trademark of 3M Corporation, St. Paul, Minnesota). In an embodiment, as described above, the fire extinguishing capsules forming the receiving parts 152 of the extinguisher sheet 150 open (or rupture) to emit the internal fire extinguishing agent when the gas passing through the duct 141 of the top plate 140 reaches a relatively high temperature of about 200° C., and the fire extinguishing capsules may open due to the pressure applied during the phase transformation in a high temperature atmosphere of about 200° C., such that the internal fire extinguishing agent encapsulated within the fire extinguishing capsules is emitted.

In an embodiment, a ratio of the weight of the fire extinguishing agent in the extinguisher sheet 150 to a total weight of the extinguisher sheet 150 may be in a range from 30% to 50%. In other words, a proportion of the fire extinguishing agent contained in the extinguisher sheet 150 to the overall weight of the extinguisher sheet 150 may be in a range from about 30% to about 50%. When the ratio of the weight of the fire extinguishing agent to the total weight of the extinguisher sheet 150 is greater than or equal to 30%, a fire on the battery cell 120 can be appropriately extinguished during the operation of the extinguisher sheet 150. When the ratio of the weight of the fire extinguishing agent to the total weight of the extinguisher sheet 150 is less than or equal to 50%, the extinguisher sheet 150 may be easily set to operate (e.g., rupture) at about 200° C.

In an embodiment, an amount of the fire extinguishing agent may be in a range from 0.12 g/cm$^3$ to 0.82 g/cm$^3$. When the amount of the fire extinguishing agent is greater than or equal to 0.12 g/cm$^3$, the fire extinguishing agent contained in the extinguisher sheet 150 is appropriate for the capacity of battery cells used in the energy storage module 100 including the extinguisher sheet 150 so as to be able to extinguish a fire on any one of the battery cells. When the amount of the fire extinguishing agent is less than or equal to 0.82 g/cm$^3$, the extinguisher sheet 150 may be easily set to operate (e.g., rupture) at about 200° C. or higher.

Figure 10B:
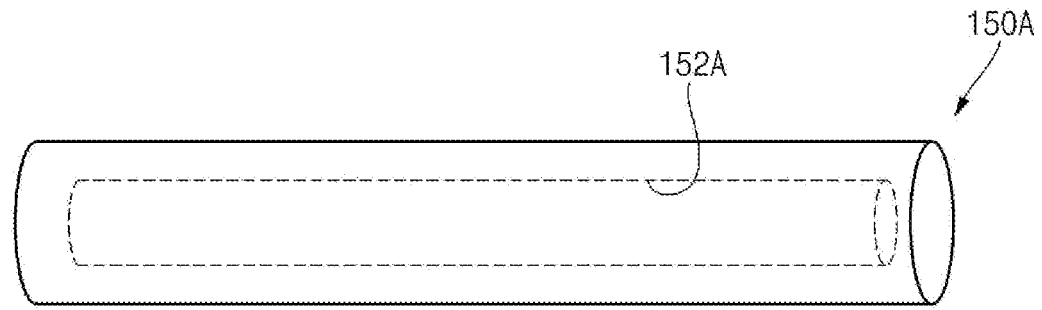

In an embodiment, as shown in FIG. 10B, another example extinguisher sheet 150A may include a tube-type receiving space 152A for receiving (e.g., accommodating or storing) a fire extinguishing agent within the receiving space 152A.

Figure 10C:
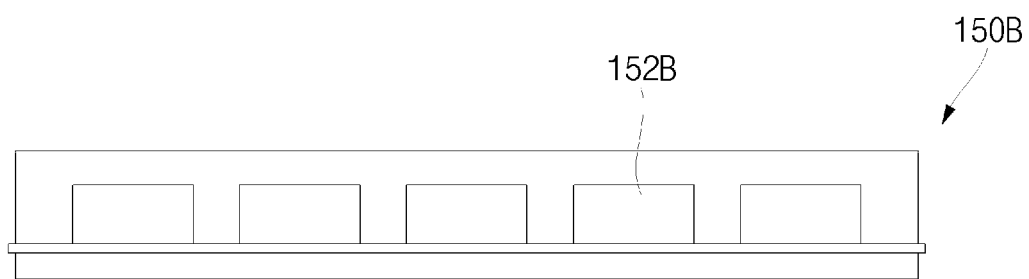

In an embodiment, as shown in FIG. 10C, another example extinguisher sheet 150B may include receiving spaces 152B arranged within the extinguisher sheet 150B to be spaced apart from each other by a distance (e.g., a regular distance). The receiving spaces 152B may include a plurality of receiving spaces to be spaced apart from one another, unlike in the tube-type extinguisher sheet 150A shown in FIG. 10B. In an embodiment, the receiving spaces 152B of the extinguisher sheet 150B may open (e.g., rupture) responsive to only one of the battery cells 120, from which a relatively high-temperature gas is generated, to then emit the fire extinguishing agent. Therefore, when the gas is generated from the plurality of battery cells 120, a fire on a corresponding one of the battery cells 120 can be extinguished.

Figure 10D:
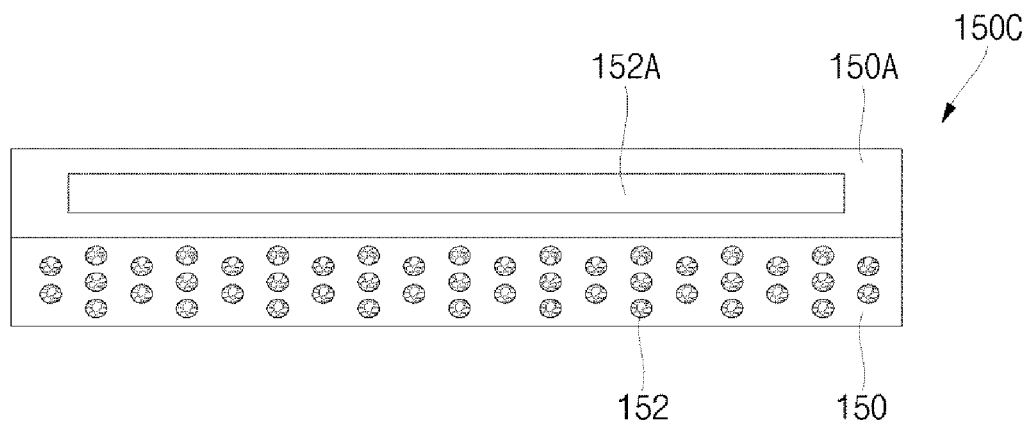

In an embodiment, as shown in FIG. 10D, another example extinguisher sheet 150C may have a multi-layered structure including different types of layers. For example, the extinguisher sheet 150C may include an underlying first extinguisher sheet 150 having capsules 152 located therein, and an overlying second extinguisher sheet 150A having a tube-type receiving space 152A. In an embodiment, the first extinguisher sheet 150 and the second extinguisher sheet 150A may be set to operate at different temperatures. In an embodiment, the first extinguisher sheet 150 and the second extinguisher sheet 150A may operate in sequence according to the temperature and amount of the discharged gas. In addition, with such double-mode operation of the extinguisher sheet 150C, the extinguisher sheet 150C may operate in sequence according to the temperature and the time of gas generated, thereby constantly emitting the fire extinguishing agent.

Herein, configurations and operations of the battery cells 120 and the insulation spacers 130 in the energy storage module according to an embodiment of the present invention will be described.

Figure 11:
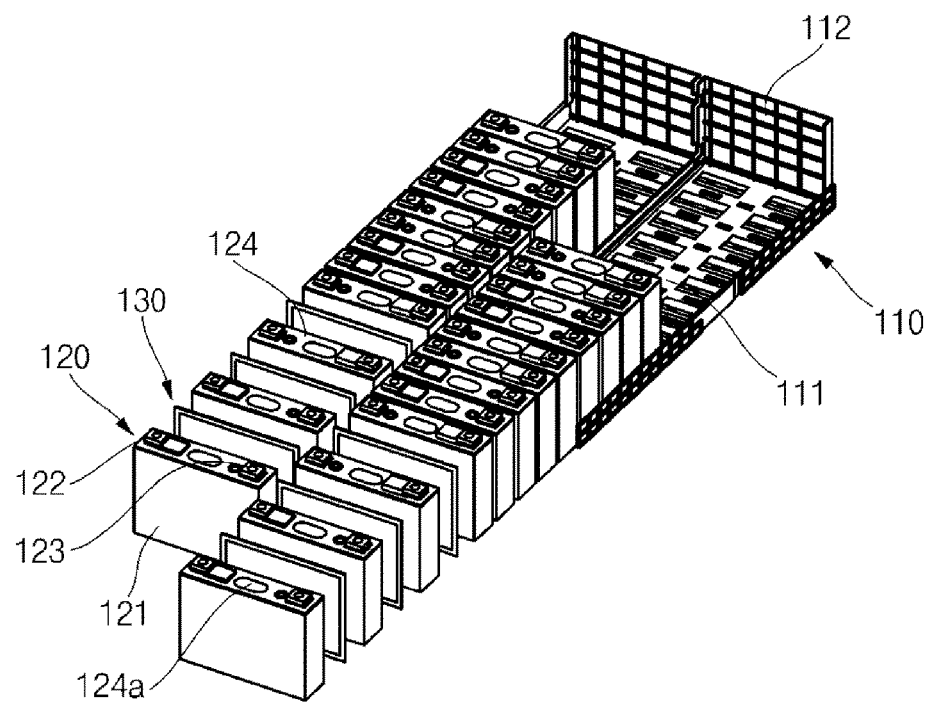
FIG. 11 is a perspective view of battery cells and insulation spacers arranged in a bottom plate of the energy storage module shown in FIGS. 1 to 3.
Figure 12:
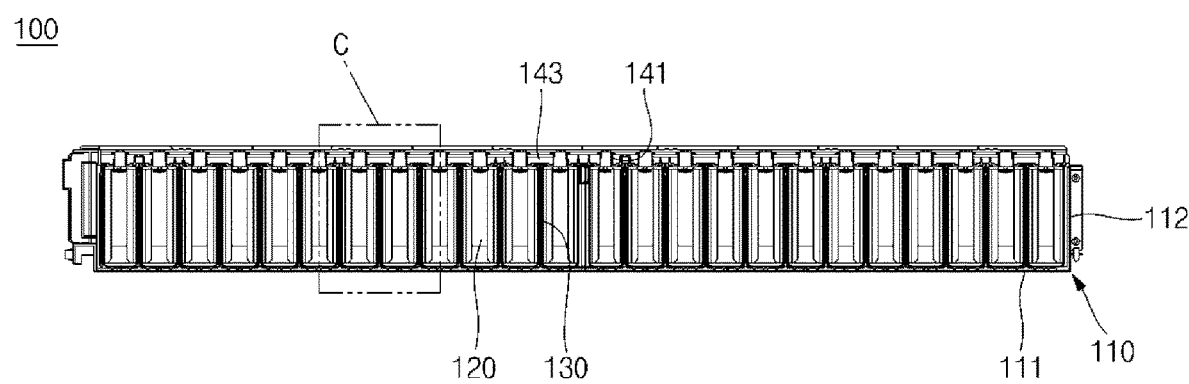
FIG. 12 is a cross-sectional view taken along the line C-C of FIG. 1.
Figure 13:
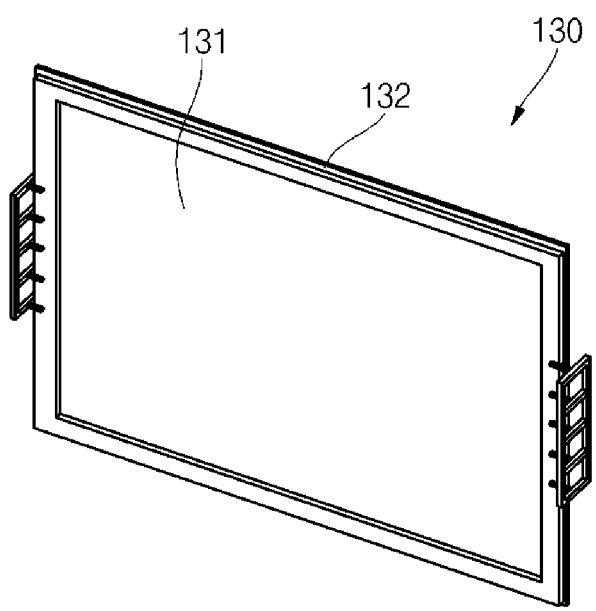
FIG. 13 is a perspective view illustrating a configuration of an insulation spacer in the energy storage module shown in FIGS. 1 to 3.
Figure 14A:
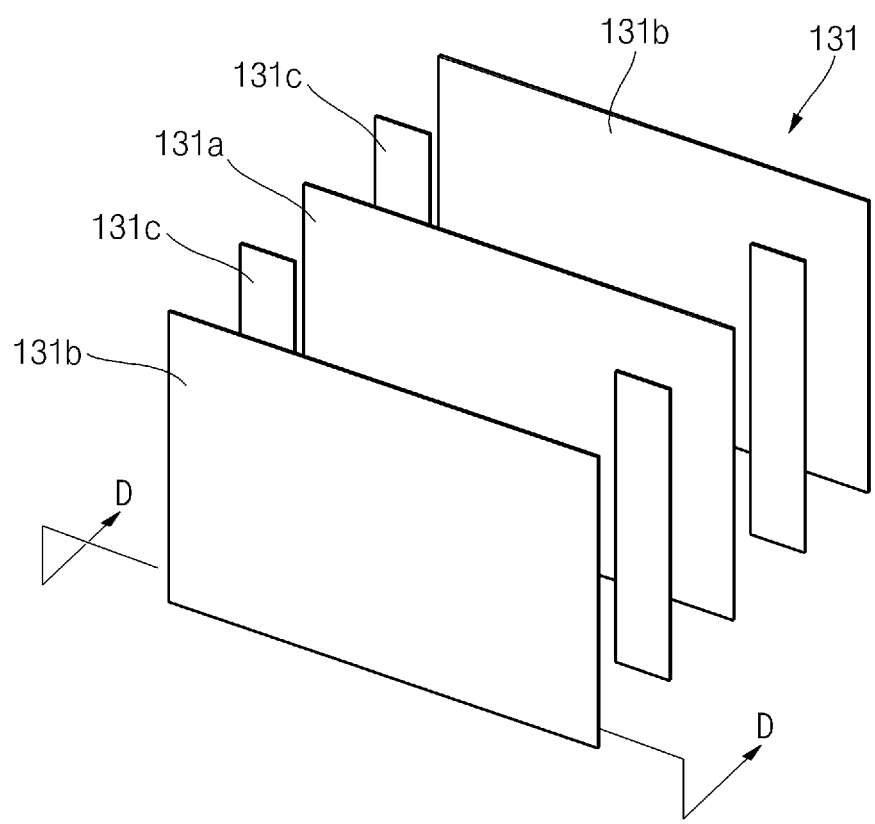
FIGS. 14A and 14B are exploded perspective views illustrating some example configurations of sheet parts of the insulation spacers in the energy storage module according to embodiments of the present disclosure.
Figure 14B:
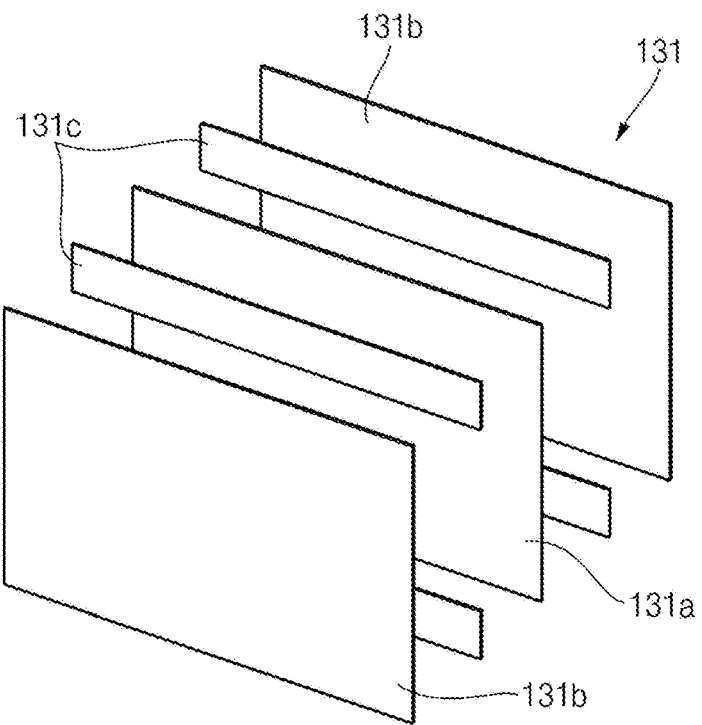
Figure 15:
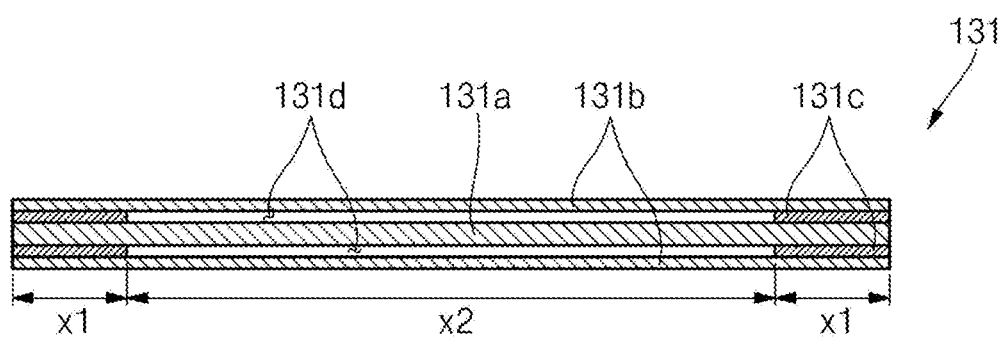
FIG. 15 is a cross-sectional view taken along the line D-D of FIG. 14A after the sheet parts are adhered to each other.
Figure 16:
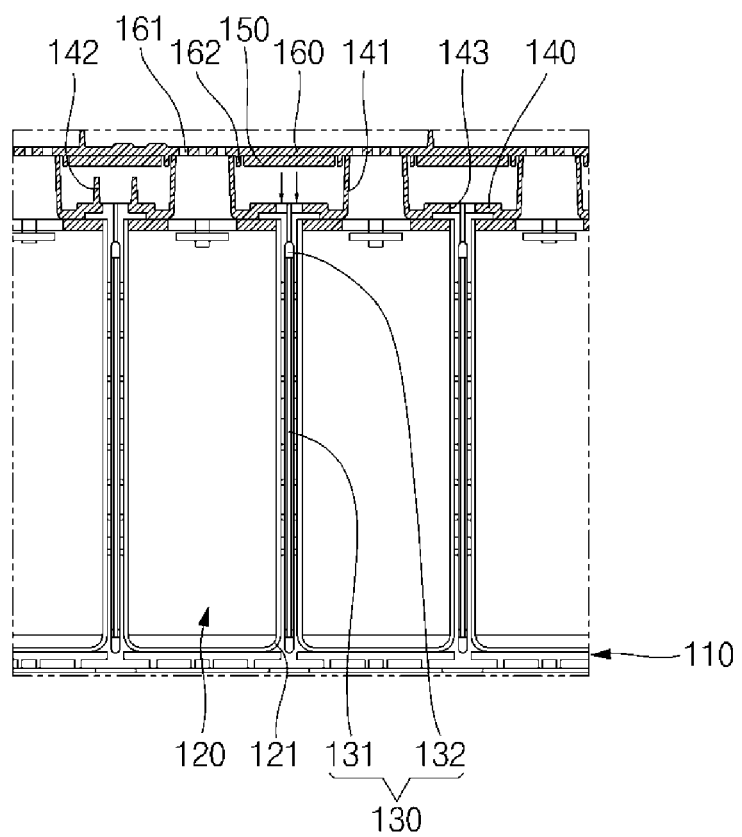
FIG. 16 is an enlarged view of a region "C" of FIG. 12.

FIG. 11 is a perspective view of battery cells and insulation spacers arranged in a bottom plate of the energy storage module shown in FIGS. 1 to 3; FIG. 12 is a cross-sectional view taken along the line C-C of FIG. 1; FIG. 13 is a perspective view illustrating a configuration of an insulation spacer in the energy storage module shown in FIGS. 1 to 3; FIGS. 14A and 14B are exploded perspective views illustrating some example configurations of sheet parts of the insulation spacers in the energy storage module according to embodiments of the present disclosure; FIG. 15 is a cross-sectional view taken along the line D-D of FIG. 14A after the sheet parts are adhered to each other; and FIG. 16 is an enlarged view of a region "C" of FIG. 12.

In an embodiment, the battery cells 120 may be alternately arranged on a top surface of the bottom plate 111 of the cover member 110 with the insulation spacers 130 (e.g., with the insulation spacers 130 arranged between adjacent ones of the battery cells 120). For example, the battery cells 120 may be arranged in a plurality of columns (e.g., two columns) along the top surface of the bottom plate 111, and the insulation spacers 130 may be positioned between adjacent ones of the battery cells 120.

Each of the battery cells 120 includes an electrode assembly accommodated in a case 121. The electrode assembly may be configured by winding, stacking, or laminating a positive electrode plate and a negative electrode plate, each having a portion coated with an active material (e.g., a coating or coated portion), in a state in which a separator is positioned between the positive electrode plate and the negative electrode plate. In an embodiment, electrode terminals 122 and 123, which are electrically connected to uncoated regions (e.g., uncoated portions) of the positive and negative electrode plates, may be exposed at an upper portion of the case 121 through the cap plate 124. The electrode terminals 122 and 123 may be referred to as a first electrode terminal 122 and a second electrode terminal 123, respectively, defining, for example, a negative electrode terminal and a positive electrode terminal, but the polarities thereof may be reversed. Occurrences of ignition of the battery cells 120 can be reduced by using particular compositions of active materials of the battery cells 120, thereby increasing safety.

The battery cells 120 and insulation spacers 130 may be alternately arranged on a top surface of the bottom plate 111 of the cover member 110. Here, the battery cells 120 may be arranged such that the long side surface of one of the battery cells 120 is spaced a distance (e.g., a reference or predetermined distance) apart from a long side surface of another (e.g., an adjacent) one of the battery cells 120, and the insulation spacers 130 are positioned between the neighboring battery cells 120. In an embodiment, the distance (e.g., a first distance) between the long side surfaces of the two neighboring battery cells 120 may be in a range from about 4 mm to about 6 mm. If the first distance is smaller than 4 mm, it is not easy to provide air layers between the battery cells 120 and the insulation spacers 130, thereby lowering cooling efficiency. If the first distance is greater than 6 mm, the energy storage module 100 may become unnecessarily bulky.

The insulation spacers 130 positioned between each of the battery cells 120 may prevent or substantially prevent the battery cells 120 from contacting each other, thereby maintaining the cases 121 of the battery cells 120 in an electrically isolated state. In an embodiment, each of the insulation spacers 130 may have a planar size corresponding to that of the long side surface of one battery cell 120. For example, one surface of the insulation spacer 130 may face the long side surface of one battery cell 120, and the other surface of the insulation spacer 130 may face the long side surface of another battery cell 120.

In an embodiment, the insulation spacer 130 and the long side surface of the battery cell 120 may be spaced apart by a distance (e.g., a second distance) to define a passage for external air. The battery cell 120 may be cooled by the external air passing through the external air passage.

In an embodiment, the insulation spacers 130 may include a sheet part (e.g., a sheet) 131 and an edge part (e.g., an edge) 132. The sheet part 131 may include a flame-retardant (or non-combustible) sheet that prevents (or substantially impedes) a fire from spreading to neighboring battery cells 120 and a heat-insulating sheet that prevents (or substantially impedes) heat from being propagated to neighboring battery cells 120 when a fire starts in any of the battery cells 120. In some embodiments, the sheet part 131 may include a heat-insulating first sheet 131a and a plurality of (e.g., two) flame-retardant (or non-combustible) second sheets 131b adhered to opposite surfaces of the first sheet 131a by one or more adhesion members 131c. In an embodiment, the sheet part 131 may have an increased heat insulating effect and may provide flame retardancy (and non-combustibility) by stacking multiple layers of the first sheet 131a and the second sheets 131b. For example, the insulation spacers 130 may prevent or substantially prevent heat or flames from propagating to neighboring battery cells 120 through the stacked sheet parts 131 when the temperature of the battery cell 120 rises or flames are generated in the battery cell 120.

The insulation spacers 130 may include a flame-retardant (or non-combustible) sheet that prevents (or substantially impedes) flames from propagating to neighboring battery cells 120 and a heat-insulating sheet that prevents (or substantially impedes) heat from being propagated to neighboring battery cells 120 when a fire starts in any of the battery cells 120, and configurations of the insulation spacers 130 will be described later in further detail.

In an embodiment, the first sheet 131a and the second sheets 131b may have a same size (e.g., the same length and width). In an embodiment, to facilitate movement of the fire extinguishing agent, which will be described later, a thickness of the insulation spacer 130 may not exceed 50% of the first distance (e.g., may not exceed 50% of the distance between the adjacent battery cells 120). For example, when the first distance is about 6 mm, the thickness of the insulation spacer 130 may not exceed about 3 mm. When the first distance is about 4 mm, the thickness of the insulation spacer 130 may not exceed about 2 mm. In one embodiment, the first sheet 131a may have a thickness in a range from about 1 mm to about 1.4 mm. In an embodiment, each of the second sheets 131b may have a thickness in a range from about 0.1 mm to about 0.2 mm, and the adhesive member 131c may have a thickness of about 0.1 mm.

In an embodiment, for example, the first sheet 131a may include (or may be formed of) ceramic paper, and the second sheets 131b may include (or may be formed of) mica (e.g. mica paper). In an embodiment, the first sheet 131a may further include an aerogel. In this embodiment, because an air layer is sufficiently provided in the first sheet 131a, heat insulating efficiency can be increased. In addition, the first sheet 131a may include (or may be) ceramic paper made of a fiber-containing refractory insulating material. In addition, the first sheet 131a may include (or may be) bio-soluble fiber ceramic paper (e.g. ceramic fiber) containing an alkaline earth metal, which is an eco-friendly high-temperature insulating material that is generally harmless to humans.

In some embodiments, the sheet part 131 may have a configuration shown in FIG. 14A or FIG. 14B.

As shown in FIGS. 14A and 15, the adhesion member 131c is positioned between the opposite ends x1 of the first sheet 131a and each of the second sheets 131b such that the sheet part 131 has a reference (or predetermined) width. The adhesion member 131c may attach the first sheet 131a and the second sheets 131b to each other. In an embodiment, the adhesion member 131c may have a same length as the first sheet 131a and the second sheets 131b in a length direction. For example, opposite ends x1 of the first sheet 131a may be adhered to respective opposite ends x1 of the second sheets 131b by the adhesion member 131c.

In an embodiment, the adhesion member 131c may have a width in a range from about 10 mm to about 20 mm. Here, if the width of the adhesion member 131c is smaller than about 10 mm, adhesion between the first sheet 131a and the second sheets 131b may be insufficient. If the width of the adhesion member 131c is greater than about 20 mm, an ignition probability may increase due to the adhesion member 131c.

The adhesion member 131c may have any of a variety of adhesive components or configurations, such as a double-sided tape or an adhesive tape, but the adhesive components and configurations of the adhesion member 131c are not limited thereto.

The adhesion member 131c may attach (e.g., may only attach) the opposite ends x1 of the first sheet 131a to the second sheets 131b such that the first sheet 131a and the second sheets 131b are spaced apart from each other at a central portion x2 of the sheet part 131. As a result, air passages 131d may be established between the first sheet 131a and the second sheets 131b. In addition, if the sheet part 131 is compressed due to swelling of the battery cell(s) 120, the air passages 131d established at the central portion x2 of the sheet part 131 may reduce (or mitigate) compression of the sheet part 131.

As shown in FIG. 14B, according to another embodiment, the adhesion member 131c may be located at an area at (or adjacent to) top and bottom ends of the first sheet 131a to attach the first sheet 131a and the second sheets 131b to each other. In an embodiment, the adhesion member 131c may have a same width as the first sheet 131a and the second sheets 131b in a width direction. For example, the top and bottom ends of the first sheet 131a may be respectively adhered to top and bottom ends of the second sheets 131b by the adhesion member 131c.

In an embodiment, when the sheet part 131 has a width-direction size less than twice a height-direction size thereof, as shown in FIG. 14A, the adhesion member 131c may be attached to the opposite ends of the sheet part 131. However, when the width-direction size of the sheet part 131 is greater than or equal to twice the height-direction size thereof, an adhesion area (e.g., a vertical adhesion area) may be reduced relative to the overall area of the sheet part 131 due to an area occupied by the adhesion member 131c attached to the opposite ends of the sheet part 131, thereby lowering adhesion performance.

Therefore, in an embodiment, when the width-direction size of the sheet part 131 is greater than twice the height-direction size, the adhesion member 131c may be applied to the top and bottom ends thereof to increase the adhesion area, thereby improving the adhesion performance. The configuration of the sheet part 131 shown in FIG. 14B may be substantially the same as the sheet part 131 shown in FIGS. 14A and 15, except for positions of the adhesion members 131c.

In an embodiment, when the adhesion member 131c is applied to the top and bottom ends of the sheet part 131, the adhesion performance may be improved, and in some embodiments, no edge part (described below) may be separately required (e.g., an edge part may be omitted).

In some embodiments, the edge part 132 may be provided along peripheral edges of the sheet part 131. In an embodiment, the edge part 132 may include (or may be made of) a plastic material, such as a general polyethylene or polypropylene, and may be coupled to edges of the sheet part 131 by using a double injection process to fix the shape of the sheet part 131. In some embodiments, the edge part 132 may have a width in a range from about 3 mm to about 6 mm. If the width of the edge part 132 is smaller than about 3 mm, the sheet part 131 may not be easily fixed, and if the width of the edge part 132 is greater than about 6 mm, an ignition probability of the edge part 132 made of a plastic material may be increased.

As described above, when a fire extinguishing agent is applied from top portions of the insulation spacers 130, the fire extinguishing agent may move downwardly along the surfaces of the sheet part 131. Therefore, the fire extinguishing agent may contact the case 121 of the adjacent battery cells 120, thereby performing extinguishing and cooling operations on the battery cells 120. Herein, movement of the fire extinguishing agent will be described in further detail.

As shown in FIG. 16, the top plate 140 may further include the openings 143 respectively located to correspond to (e.g., located over or above) the insulation spacers 130. Accordingly, the fire extinguishing agent, when emitted from the extinguisher sheet 150, may pass through the top plate 140 through the openings 143 of the top plate 140 to reach the insulation spacers 130. In addition, the fire extinguishing agent may move along surfaces of the insulation spacers 130 that face the case 121 of the adjacent battery cells 120, thereby extinguishing a fire and cooling the battery cells 120. The fire extinguishing agent is emitted by the extinguisher sheet 150 located over one or more of the battery cells 120, the temperature of which is higher than a reference temperature (e.g., about 200° C.). Therefore, the fire extinguishing agent may be sprayed from a top portion of the battery cell 120 having an elevated temperature. In addition, because the fire extinguishing agent moves along the surfaces of the insulation spacers 130 positioned at front and rear sides of the corresponding battery cell 120, both extinguishing and cooling of the corresponding battery cell 120 can be performed.

Herein, a configuration of an energy storage module according to another embodiment of the present disclosure will be described.

Figure 17:
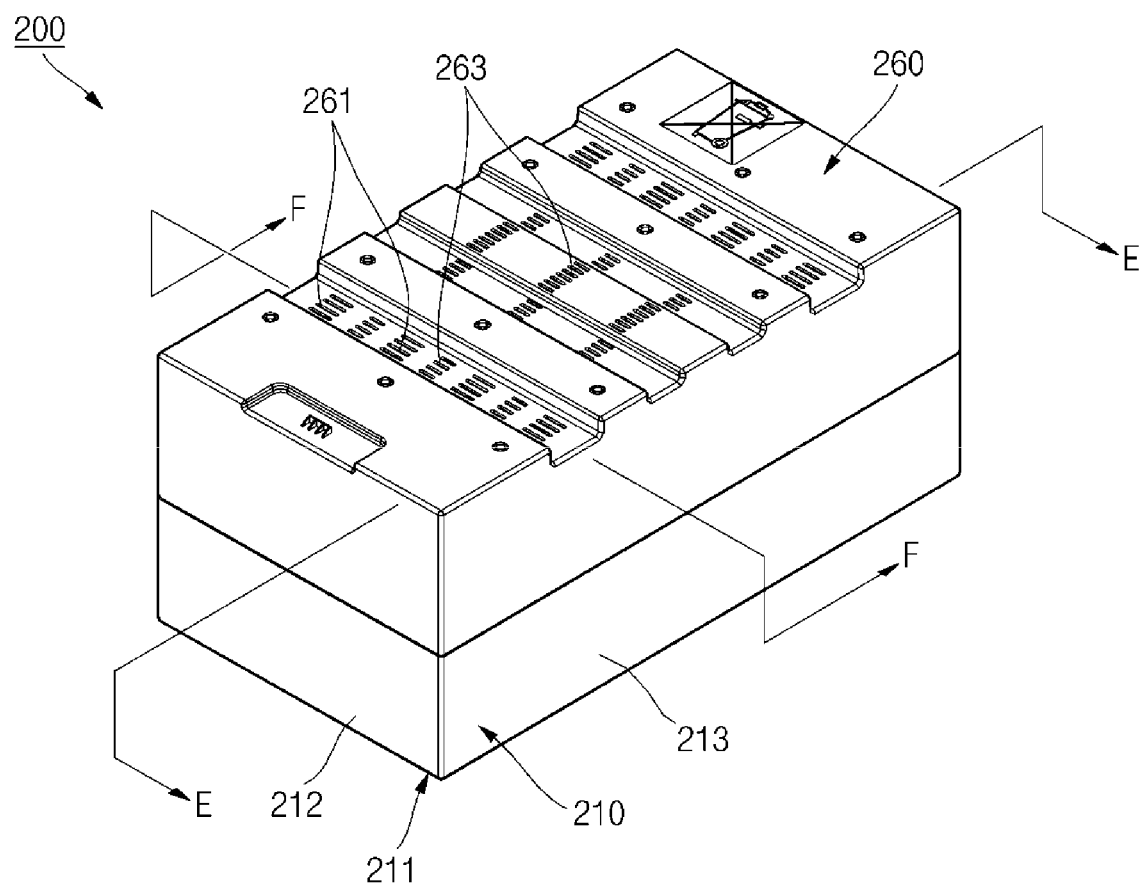
FIG. 17 is a perspective view of an energy storage module according to another embodiment of the present disclosure.
Figure 18:
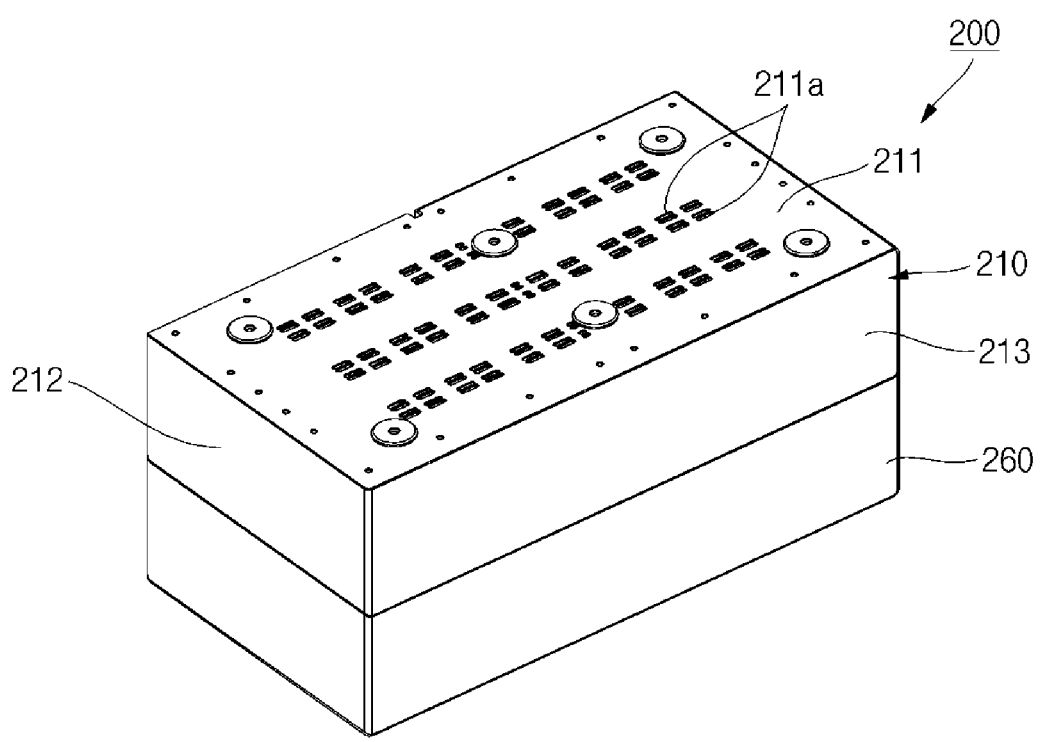
FIG. 18 is a bottom perspective view of the energy storage module shown in FIG. 17.
Figure 19:
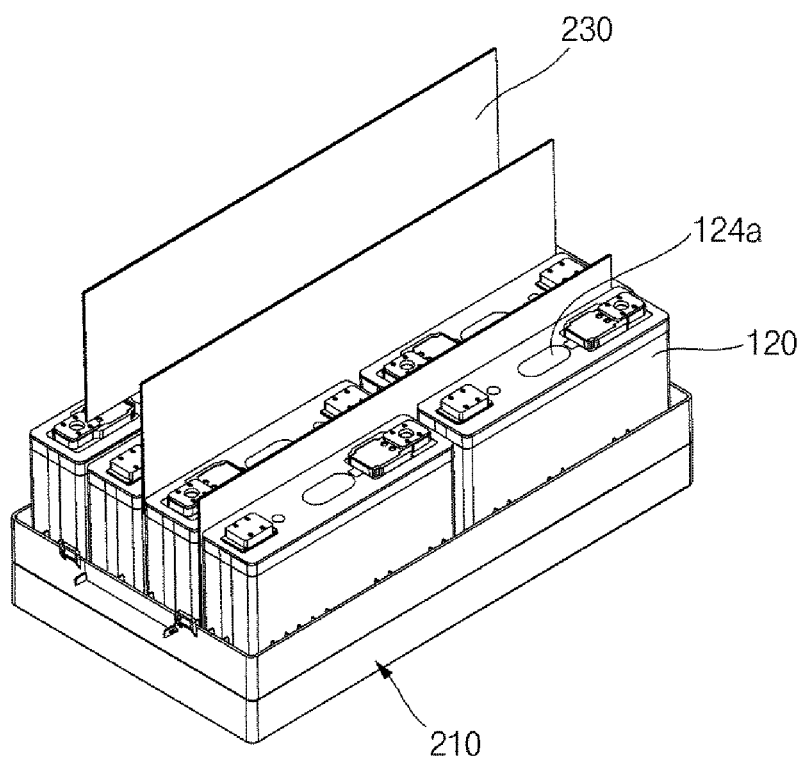
FIG. 19 is a perspective view illustrating a state in which battery cells and insulation spacers are arranged in a cover member of the energy storage module according to an embodiment of the present disclosure.
Figure 20:
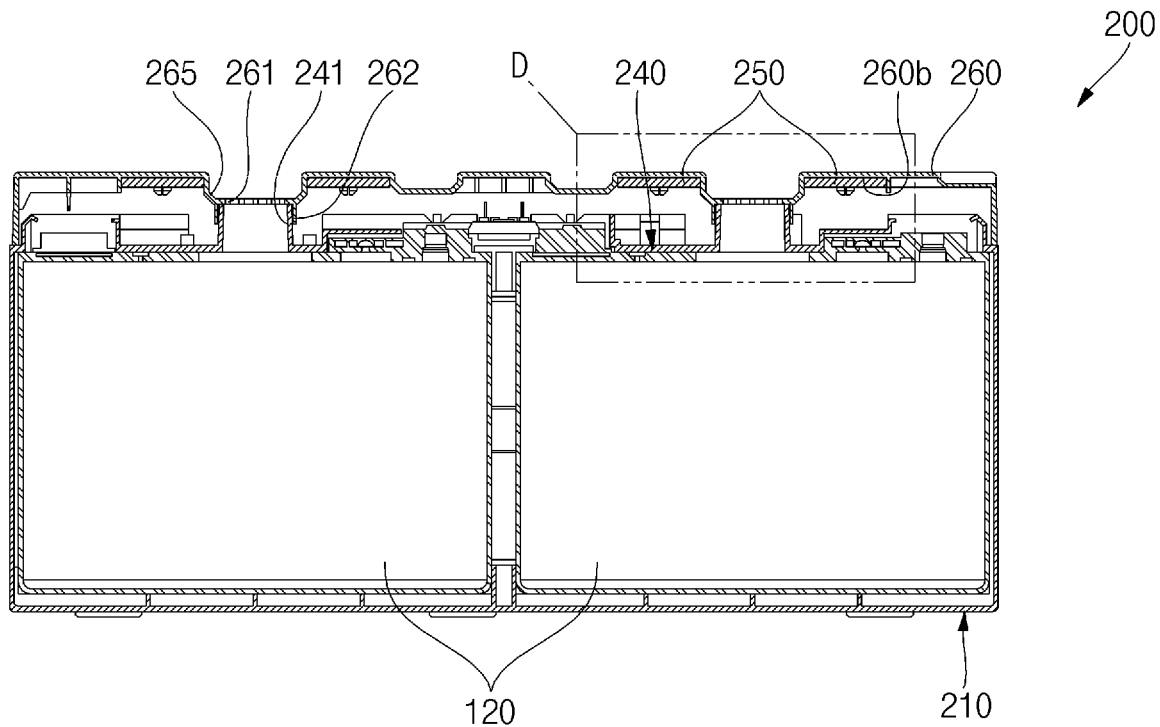
FIG. 20 is a cross-sectional view taken along the line E-E of FIG. 17.
Figure 21:
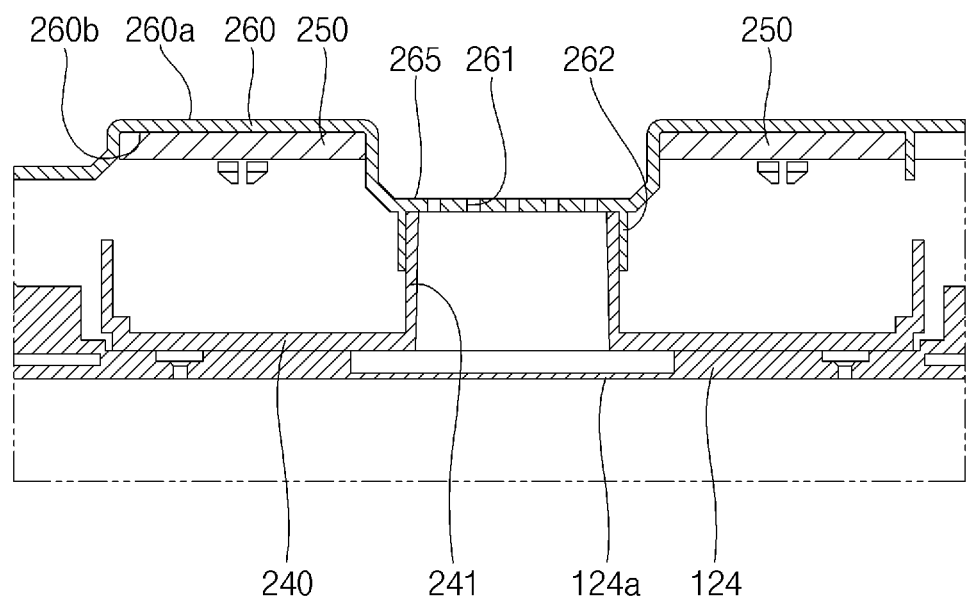
FIG. 21 is an enlarged view of a region "D" of FIG. 20.

FIG. 17 is a perspective view of an energy storage module according to another embodiment of the present disclosure; FIG. 18 is a bottom perspective view of the energy storage module shown in FIG. 17; FIG. 19 is a perspective view illustrating a state in which battery cells and insulation spacers are arranged in a cover member of the energy storage module according to an embodiment of the present disclosure; FIG. 20 is a cross-sectional view taken along the line E-E of FIG. 17; and FIG. 21 is an enlarged view of a region "D" of FIG. 20.

Referring to FIGS. 17 to 21, the energy storage module 200 according to another embodiment of the present disclosure includes a cover member 210, battery cells 120, insulation spacers 230, a top plate 240, an extinguisher sheet 250, and a top cover 260.

The energy storage module 200 according to an embodiment of the present disclosure may be smaller in size than the energy storage module 100 described above, such that a smaller number of battery cells 120 can be received in a space of the energy storage module 200, which is formed together by the cover member 210, the top plate 240, and the top cover 260, than in the energy storage module 100. Therefore, configurations and sizes of the cover member 210, the top plate 240, and the top cover 260 may vary according to the number of battery cells received therein. However, the energy storage module 200 may be basically configured in a similar manner as the energy storage module 100.

The cover member 210 may include a bottom plate, an end plate (or a plurality of end plates), and a side plate (or a plurality of side plates) which together form a space in which the battery cells 120 and the insulation spacers 230 are alternately arranged with the battery cells 120 on the bottom plate. In addition, the cover member 210 may fix positions of the battery cells 120 and the insulation spacers 230 and may protect the battery cells 120 from external impacts. In an embodiment, the bottom plate may further include through-holes 211*a*, through which the fire extinguishing agent from the extinguisher sheet 250 and the air moving along the exterior surfaces of the insulation spacers 230 are exhausted. The through-holes 211*a* may be positioned to correspond to the insulation spacers 230.

The insulation spacers 230 are positioned between adjacent ones of the battery cells 120 to prevent or substantially prevent the battery cells 120 from contacting one another, thereby maintaining the cases 121 of the battery cells 120 in electrically isolated states. In an embodiment, each of the insulation spacers 230 may have short side surfaces, each having a planar size sufficient to entirely cover the long side surfaces of two adjacent battery cells 120. In an embodiment, for example, one of the insulation spacers 230 may be positioned between each group of four adjacent battery cells 120, which are arranged such that long side surfaces of two of the four battery cells 120 face each other. In an embodiment, a distance is maintained between each of the insulation spacers 230 and the battery cells 120 to define external air passages and/or fire extinguishing agent passages, thereby allowing for cooling of the battery cells 120. The insulation spacers 230 may include (or may be made of) a flame-retardant (or non-combustible) sheet that prevents (or substantially mitigates) a fire from spreading to neighboring battery cells and a heat-insulating sheet that prevents (or substantially mitigates) heat from propagating to neighboring battery cells when a fire outbreaks in any of the battery cells 120. The configurations of the insulation spacers 230 will be described in further detail below.

The top plate 240 is coupled to a top portion of the cover member 210. The top plate 240 may be coupled to the cover member 210 while covering top portions of the battery cells 120. The top plate 240 includes ducts 241 respectively corresponding to the vents 124*a* located on a top surface of each of the battery cells 120. The ducts 241 may be arranged in a direction, for example, in a length direction of the top plate 240. Accordingly, if the vent 124*a* ruptures, the gas discharged through the vent 124*a* of the battery cell 120 may move upwardly along the duct 241 of the top plate 240. The configurations and operations of the ducts 241 will be described in further detail below.

The extinguisher sheet 250 is positioned between the top plate 240 and the top cover 260. In an embodiment, the extinguisher sheet 250 may include a plurality of planar sheets located at opposite sides of the ducts 241 of the top plate 240 and extending in a length direction of the top plate 240. The extinguisher sheet 250 may be mounted on a bottom surface 260*b* of the top cover 260. Here, the length direction may refer to a direction in which the ducts 241 of the top plate 240 extend.

The top cover 260 is coupled to the top portion of the top plate 240. The top cover 260 may cover the top plate 240 and the extinguisher sheet 250, thereby protecting the top plate 240 and the extinguisher sheet 250 from external impacts applied to a top surface 260*a* of the top cover 260. In addition, the top cover 260 may include an exhaust area 265 having discharge holes 261 located therein, and protrusion parts (e.g., protrusions) 262 located on the bottom surface 260*b* of the top cover 260. The ducts 241 may be respectively coupled to (e.g., may respectively extend into) the interior of the protrusion parts 262. In an embodiment, each of the discharge holes 261 may include a plurality of discharge holes arranged in a direction, for example, in a length direction of the top cover 260. In addition, the discharge holes 261 may be positioned to correspond to the ducts 241 of the top plate 240. Accordingly, if the vent 124*a* of the battery cell 120 ruptures, the gas discharged through the vent 124*a* of the battery cell 120 may move to the exterior along the ducts 241 of the top plate 240 and the discharge holes 261 of the top cover 260.

In an embodiment, the exhaust area 265 having the discharge holes 261 has a smaller height than other regions in the top cover 260. For example, the exhaust area 265 is configured to downwardly protrude from the top cover 260 to establish a gas movement passage therein. The exhaust area 265 is coupled to the top portion of the duct 241. Here, the protrusion part 262 located on the bottom surface of the exhaust area 265 is coupled to the exterior of the duct 241. In an embodiment, the duct 241 may be configured to have a smaller height than the top cover 260. With this configuration, the gas discharged through the ducts 241 and the discharge holes 261 may gather in the gas movement passage located on the exhaust area 265. In an embodiment, the gas may be discharged to an exterior side by using, for example, a separate fan or a suction structure (e.g., a vacuum), thereby allowing the gas generated by the battery cells 120 to be discharged quickly.

Herein, configurations and operations of battery cells 120 and insulation spacers 230 in an energy storage module according to an embodiment of the present disclosure will be described.

Figure 22A:
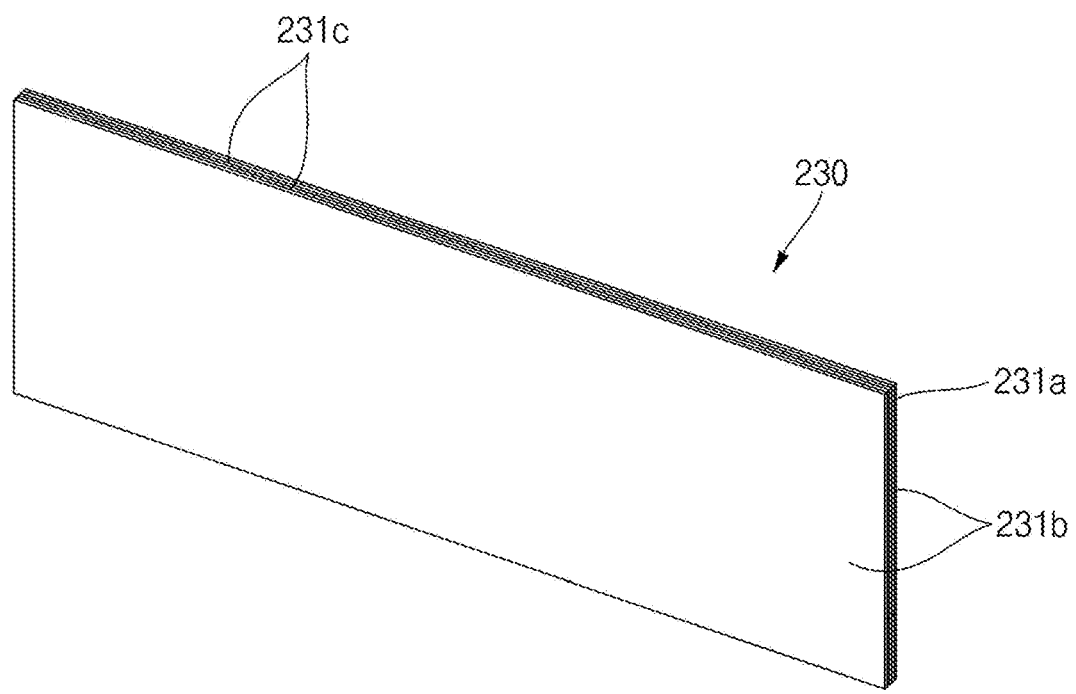
Figure 23:
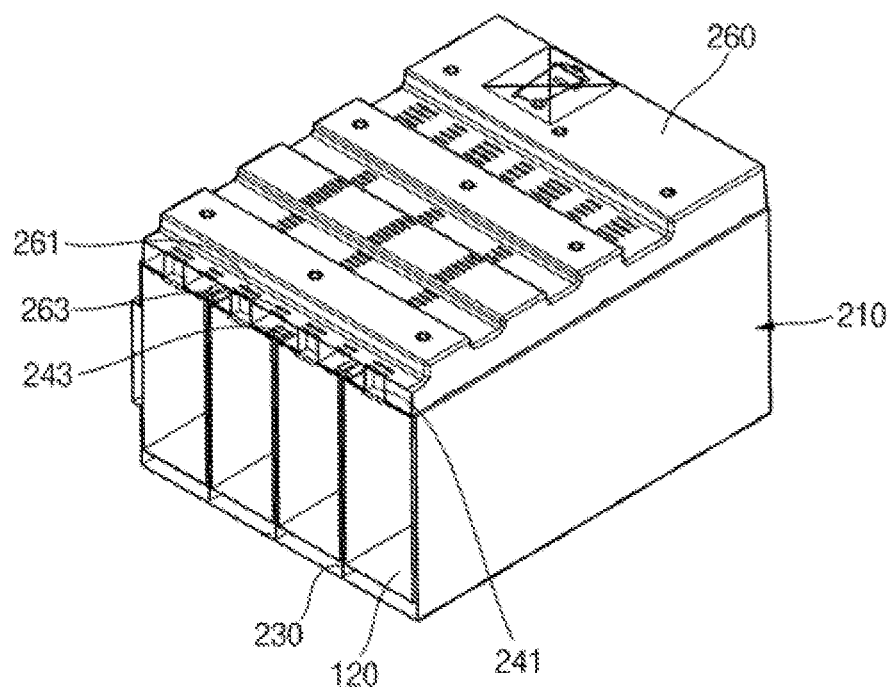
FIG. 23 is a cross-sectional view taken along the line F-F of FIG. 17.

FIGS. 22A and 22B are a perspective view and an exploded perspective view, respectively, illustrating configurations of insulation spacers in the energy storage module shown in FIGS. 17 to 21; and FIG. 23 is a cross-sectional view taken along the line F-F of FIG. 17.

In an embodiment, the battery cells 120 and the insulation spacers 230 may be alternately arranged on a top surface of the bottom plate of the cover member 210. In an embodiment, each of the insulation spacers 230 may have side surfaces, each having a planar size sufficient to entirely cover long side surfaces of two adjacent battery cells 120. For example, one surface of one of the insulation spacers 230 may entirely cover the long side surfaces of two adjacent battery cells 120, and the other surface of the one insulation spacer 230 may entirely cover the long side surfaces of two other adjacent battery cells 120. For example, one of the insulation spacers 230 may be positioned between four battery cells 120 that are arranged such that long side surfaces of two battery cells 120 face long side surfaces of two other battery cells 120.

In addition, long side surfaces of the battery cells 120 may be spaced by a distance (e.g., a predetermined distance) apart from long side surfaces of facing battery cells 120, and the insulation spacers 230 may be positioned between each of the long side surfaces of the battery cells 120.

In an embodiment, a distance (e.g., a first distance) between the long side surfaces of the facing battery cells 120 may be in a range from about 3.5 mm to about 4.5 mm. If the first distance is smaller than about 3.5 mm, air layers (e.g., air passages) may not be provided between each of the battery cells 120 and the insulation spacers 230, thereby lowering cooling efficiency. If the first distance is greater than about 4.5 mm, the energy storage module 200 may become unnecessarily bulky.

The insulation spacers 230, positioned between each facing pair of the battery cells 120, may prevent or substantially prevent the battery cells 120 from contacting each other, thereby maintaining the cases 121 of the battery cells 120 in electrically isolated states. In addition, the insulation spacer 230 and the long side surfaces of battery cells 120 are spaced apart from each other to establish external air passages. Here, the battery cells 120 may be cooled by external air moving along (or through) the external air passages.

In an embodiment, the insulation spacers 230 may consist of sheet parts without separate edge parts. The insulation spacers 230 may include a flame-retardant (or non-combustible) sheet that prevents (or substantially mitigates) the fire from spreading to neighboring battery cells 120 and a heat-insulating sheet that prevents (or substantially mitigates) heat from propagating to neighboring battery cells 120. For example, the sheet parts of the insulation spacers 230 may include a heat-insulating first sheet 231*a* and two flame-retardant (or non-combustible) second sheets 231*b* respectively adhered to opposite surfaces of the first sheet 231*a* by using one or more adhesive members 231*c*. In an embodiment, the first sheet 231*a* and the second sheets 231*b* have a same (or substantially the same) size. In an embodiment, a thickness of the insulation spacer 230 may not exceed about 50% of the first distance to facilitate movement of the fire extinguishing agent, which will be described in further detail below.

In an embodiment, the adhesion member 231*c* may be positioned between the first sheet 231*a* and the second sheets 231*b* at a distance (e.g., a predetermined distance) from top and bottom ends of the first sheet 231*a* to attach the first sheet 231*a* and the second sheets 231*b* to each other. In an embodiment, the adhesion member 231*c* may have a same (or substantially the same) width as the first sheet 231*a* and the second sheets 231*b* in their width directions. For example, the top and bottom ends of the first sheet 231*a* may be respectively adhered to top and bottom ends of the second sheet 231*b* by the adhesion member 231*c*.

In an embodiment, if the sheet part has a width-direction size greater than twice a height-direction size thereof, the first sheet may be adhered at the top and bottom ends thereof by the adhesion member 231*c*, thereby improving the adhesion performance. For example, when the width-direction size of the sheet part is greater than or equal to twice the height-direction size thereof, the adhesion performance may be lowered when the first sheet 231*a* and the second sheets 231*b* are adhered to each other at the opposite ends of the sheet part by the adhesion member 231*c*, like in the embodiment shown in FIG. 14A. However, in an embodiment, the sheet part may have a same or similar configuration as that of the sheet part 131 shown in FIG. 14B.

As discussed above, if a fire extinguishing agent is applied from top portions of the insulation spacers 230, the fire extinguishing agent may move downwardly along the surfaces of the sheet part. Therefore, the fire extinguishing agent may contact the case 121 of the adjacent battery cells 120, thereby extinguishing a fire and cooling the battery cells 120. Herein, the movement of the fire extinguishing agent and the cooling of the battery cells 120 using the air will be described in further detail.

As shown in FIG. 23, the top plate 240 may further include openings (e.g., opening holes) 243 located to respectively correspond to the insulation spacers 230. Accordingly, the fire extinguishing agent emitted from the extinguisher sheet 250 may pass through the top plate 240 through the openings 243 of the top plate 240 to reach the insulation spacers 230. In addition, the fire extinguishing agent may move along surfaces of the insulation spacers 230 that face the case 121 of the battery cells 120, thereby extinguishing and cooling the battery cells 120. The fire extinguishing agent is emitted (or sprayed) from the extinguisher sheet 250 above one or more of the battery cells 120, the temperature of which is higher than a reference temperature. Therefore, the fire extinguishing agent may be sprayed from a top portion of the battery cell 120, the temperature of which has increased. In addition, because the fire extinguishing agent moves along the surfaces of the insulation spacers 230 positioned at front and rear sides of the corresponding battery cell 120, the corresponding battery cell 120 can be both extinguished and cooled.

In addition, the top cover 260 may further include through-holes 263 that pass through top and bottom surfaces of the top cover 260 and are located to respectively correspond to the openings 243. For example, the through-holes 263 may respectively correspond to the insulation spacers 230.

In addition, the bottom plate 211 of the cover member 210 may also include through-holes 211*a* located to respectively correspond to the insulation spacers 230. Thus, air introduced through the through-holes 263 of the top cover 260 and the openings 243 of the top plate 240 may move along spaces provided between the insulation spacers 230 and the battery cells 120 to be discharged through the openings 211*a* of the bottom plate 211. Of course, the movement of the air (e.g., the airflow direction) may be reversed. In such a way, air passages may be provided by the through-holes 211a and 263 and the openings 243, thereby improving cooling efficiency.

Hereinafter, a configuration of a battery cell 120 used in the energy storage module 100 according to an embodiment of the present invention will be described in greater detail.

Figure 24A:
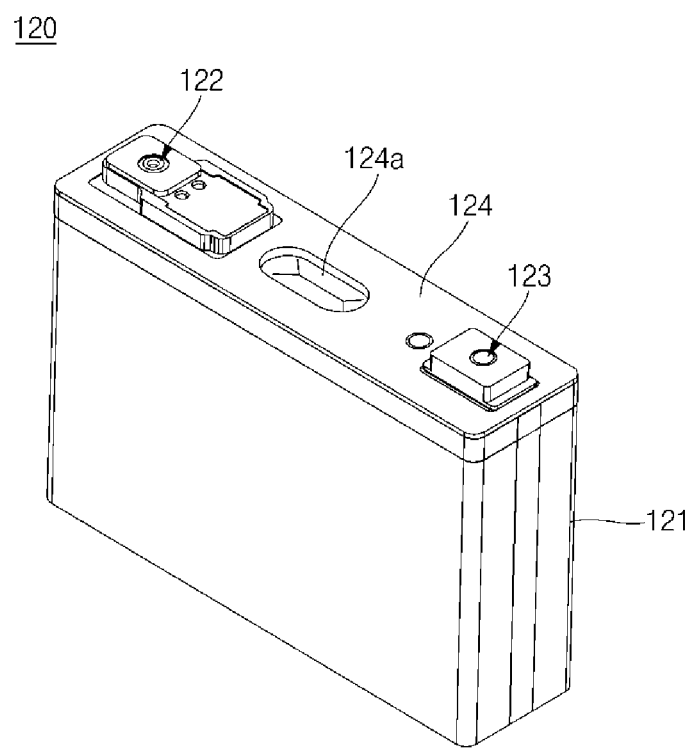
FIGS. 24A and 24B are a perspective view and a cross-sectional view, respectively, of a battery cell used in an energy storage module according to an embodiment of the present disclosure.
Figure 24B:
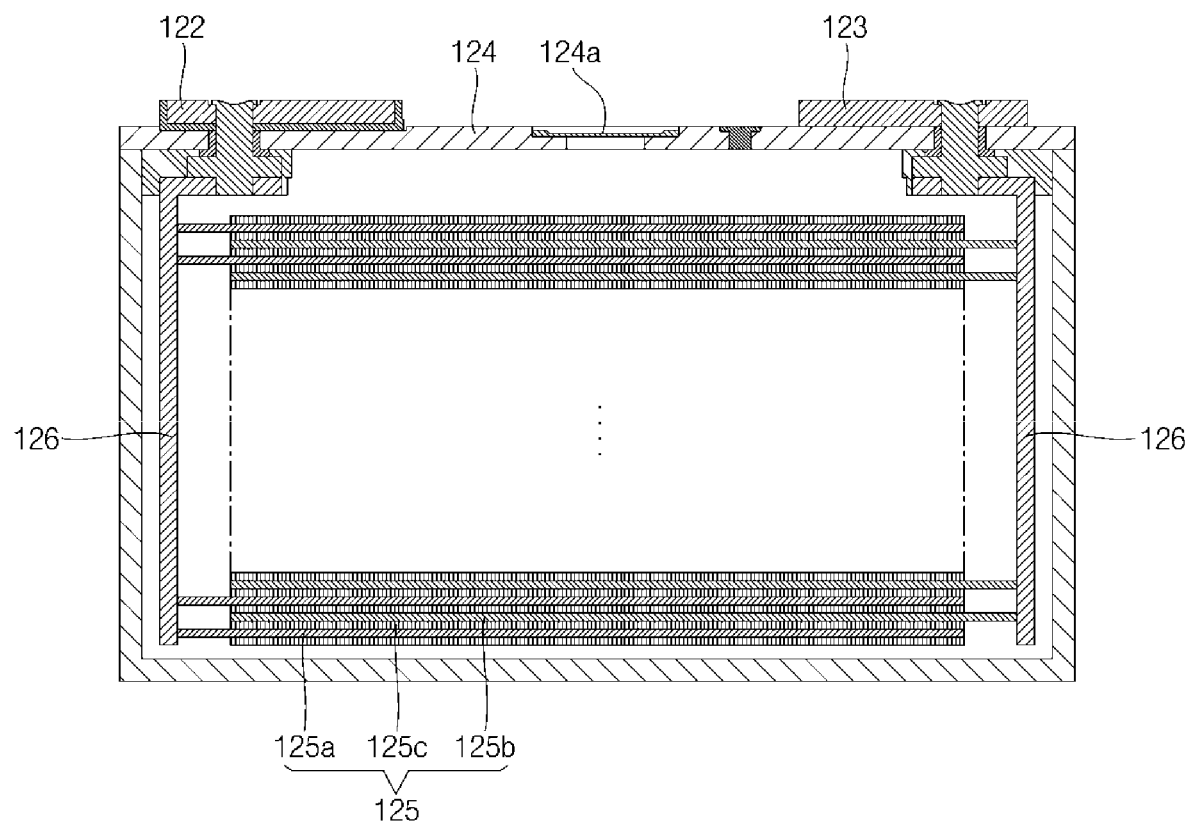

FIGS. 24A and 24B are a perspective view and a cross-sectional view, respectively, of a battery cell used in an energy storage module according to an embodiment of the present disclosure.

Referring to 24A and 24B, in an embodiment, the battery cell 120 is configured such that an electrode assembly 125 is accommodated in a case 121, and a cap plate 124 covers a top portion of the case 121. In an embodiment, a vent 124a having a smaller thickness than other regions is located approximately at a center of the cap plate 124. A duct 141 of the top plate 140 is located to correspond to a top portion of a vent 124a, as described above.

In an embodiment, the electrode assembly 125 may be electrically connected to a first electrode terminal 122 and a second electrode terminal 123 located on the cap plate 124 through a pair of current collectors 126. For the sake of convenience, in the following description, the first electrode terminal 122 will be referred to as a negative electrode terminal, and the second electrode terminal 123 will be referred to as a positive electrode terminal, but polarities thereof may be reversed.

The electrode assembly 125 may include a negative electrode 125a, a positive electrode 125b positioned to face the negative electrode 125a, and a separator 125c positioned between the negative electrode 125a and the positive electrode 125b, and the electrode assembly 125 may be accommodated in the case 121 together with an electrolyte (not shown).

While some example embodiments have been described to practice the energy storage module of the present disclosure, it will be understood by those of ordinary skill in the art that various changes in form and details may be made therein without departing from the scope of the present disclosure as set forth in the following claims.

What is claimed is:
1. An energy storage module comprising:
a plurality of battery cells arranged in a length direction such that long side surfaces of adjacent ones of the battery cells face one another, each of the long side surfaces extending in a width direction and a height direction, each of the battery cells comprising a vent at a top side thereof that is spaced apart from a bottom side thereof along the height direction;
a plurality of insulation spacers, at least one of the insulation spacers being located between the long side surfaces of an adjacent pair of the battery cells;
a cover member comprising an internal receiving space configured to accommodate the battery cells and the insulation spacers;
a top plate coupled to a top portion of the cover member and comprising ducts respectively corresponding to the vents of the battery cells and comprising opening holes respectively corresponding to the insulation spacers;
a top cover coupled to a top portion of the top plate and comprising discharge holes located in an exhaust area and corresponding to the ducts; and
an extinguisher sheet located between the top cover and the top plate, comprising a fire extinguishing agent and opening holes located to correspond to the ducts such that, in a plan view as viewed along the height direction, is arranged outside respective peripheries of the ducts,
wherein the top cover comprises protrusion parts located on a bottom surface of the top cover, covering the exhaust area, and coupled to an exterior of the ducts,
wherein the top cover further comprises an inclined part having a thickness gradually increasing toward a corresponding protrusion part of the protrusion parts in the exhaust area, and a top end of a corresponding duct of the ducts is lower than the inclined part, and
wherein an insulation spacer of the plurality of insulation spacers comprises a heat-insulating first sheet and a plurality of flame-retardant second sheets respectively adhered to opposite surfaces of the first sheet.

2. The energy storage module of claim 1, wherein the extinguisher sheet comprises the opening holes located to respectively correspond to the ducts.

3. The energy storage module of claim 1, wherein the extinguisher sheet comprises a receiving space receiving the fire extinguishing agent within an external case made of polyurea and polyurethane.

4. The energy storage module of claim 3, wherein the receiving space comprises one or more capsules or tubes.

5. The energy storage module of claim 4, wherein the fire extinguishing agent comprises a halogenated carbon compound.

6. The energy storage module of claim 1, wherein the extinguisher sheet comprises different types of sheets configured to emit the fire extinguishing agent at different temperatures.

7. The energy storage module of claim 1, wherein a percentage of the fire extinguishing agent in the extinguisher sheet is from 30% to 50%.

8. The energy storage module of claim 1, wherein an amount of the fire extinguishing agent in the extinguisher sheet is from 0.12 $g/cm^3$ to 0.82 $g/cm^3$.

9. The energy storage module of claim 1, wherein a space is defined between a corresponding duct of the ducts and the protrusion part, and some of the gas discharged from the vent passes through the duct to be discharged to the space through the inclined part.

10. The energy storage module of claim 1, wherein a duct of the ducts has an inner diameter gradually decreasing upward.

11. The energy storage module of claim 1, wherein a portion of the exhaust area extends into an interior of a duct of the ducts.

12. The energy storage module of claim 1, wherein the exhaust area has a smaller thickness than the top cover.

13. The energy storage module of claim 1, wherein the exhaust area protrudes downwardly from the top cover.

14. The energy storage module of claim 1, wherein an area of the discharge holes is greater than or equal to about 30% of that of the exhaust area.

15. The energy storage module of claim 1, wherein the first sheet comprises ceramic paper, and the second sheets comprise mica paper.

16. The energy storage module of claim 15, wherein the first sheet comprises a ceramic fiber comprising an alkaline earth metal.

17. The energy storage module of claim 1, wherein the long side surfaces of adjacent ones of the battery cells are spaced apart from each other by a first distance, and
wherein a thickness of each of the insulation spacers is less than 50% of the first distance.

18. The energy storage module of claim 1, wherein each of the insulation spacers has a width-direction size less than twice a height-direction size thereof, and
wherein the first sheet is adhered to the second sheets at opposite ends thereof by respective adhesion members.

19. The energy storage module of claim 18, wherein the insulation spacers further comprise an edge part comprising a plastic material, and
wherein the edge part is formed at peripheral edges of the first and second sheets by insert molding.

20. The energy storage module of claim 1, wherein the first sheet and the second sheets are spaced apart from each other at central portions thereof to define air passages.

21. An energy storage module comprising:
a plurality of battery cells arranged in a length direction such that long side surfaces of adjacent ones of the battery cells face one another, each of the long side surfaces extending in a width direction and a height direction, each of the battery cells comprising a vent at a top side thereof that is spaced apart from a bottom side thereof along the height direction;
a plurality of insulation spacers, at least one of the insulation spacers being located between the long side surfaces of an adjacent pair of the battery cells;
a cover member comprising an internal receiving space configured to accommodate the battery cells and the insulation spacers;
a top plate coupled to a top portion of the cover member and comprising ducts respectively corresponding to the vents of the battery cells and comprising opening holes respectively corresponding to the insulation spacers;
a top cover coupled to a top portion of the top plate and comprising discharge holes located in an exhaust area and corresponding to the ducts; and
an extinguisher sheet located between the top cover and the top plate, configured to emit a fire extinguishing agent at a temperature exceeding a certain temperature, and comprising opening holes located to correspond to the ducts such that, in a plan view as viewed along the height direction, an entirety of the extinguisher sheet including the fire extinguishing agent is arranged outside respective peripheries of the ducts,
wherein the top cover comprises protrusion parts located on a bottom surface of the top cover, covering the exhaust area, and coupled to an exterior of the ducts.

* * * * *